US010731812B2

(12) United States Patent
Nashimoto et al.

(10) Patent No.: US 10,731,812 B2
(45) Date of Patent: Aug. 4, 2020

(54) PUSH CART

(71) Applicant: MAKITA CORPORATION, Anjo-shi, Aichi (JP)

(72) Inventors: Tomonobu Nashimoto, Anjo (JP); Tetsuya Kiuchi, Anjo (JP); Katsuna Hayashi, Anjo (JP); Kouichi Takeda, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 168 days.

(21) Appl. No.: 15/876,689

(22) Filed: Jan. 22, 2018

(65) Prior Publication Data

US 2018/0216793 A1    Aug. 2, 2018

(30) Foreign Application Priority Data

Jan. 31, 2017  (JP) ................. 2017-015600

(51) Int. Cl.
| | |
|---|---|
| *F21S 41/00* | (2018.01) |
| *B60Q 1/14* | (2006.01) |
| *B60Q 1/00* | (2006.01) |
| *F21S 41/39* | (2018.01) |
| *F21S 41/143* | (2018.01) |
| *B60Q 1/04* | (2006.01) |
| *B62B 3/12* | (2006.01) |
| *B62B 5/00* | (2006.01) |
| *F21V 23/04* | (2006.01) |
| *F21S 45/50* | (2018.01) |
| *F21S 41/20* | (2018.01) |

(Continued)

(52) U.S. Cl.
CPC ............ *F21S 41/00* (2018.01); *B60Q 1/0076* (2013.01); *B60Q 1/0483* (2013.01); *B60Q 1/1415* (2013.01); *B62B 3/12* (2013.01); *B62B 5/0043* (2013.01); *B62B 5/0069* (2013.01); *F21S 41/143* (2018.01); *F21S 41/28* (2018.01); *F21S 41/29* (2018.01); *F21S 41/321* (2018.01); *F21S 41/39* (2018.01); *F21S 45/50* (2018.01); *F21V 23/0492* (2013.01)

(58) Field of Classification Search
CPC .. B60Q 1/0076; B60Q 1/0483; B60Q 1/1415; B62B 3/12; B62B 5/0043; B62B 5/0069; F21S 41/00; F21S 41/143; F21S 41/28; F21S 41/29; F21S 41/321; F21S 41/39; F21S 45/50; F21V 23/0492
See application file for complete search history.

(56) References Cited

U.S. PATENT DOCUMENTS

| | | | | | |
|---|---|---|---|---|---|
| 6,065,555 | A | * | 5/2000 | Yuki ................ | B62B 5/0026 180/19.1 |
| 6,129,166 | A | * | 10/2000 | Sueshige ............ | B60K 1/00 180/65.6 |

(Continued)

FOREIGN PATENT DOCUMENTS

JP    2011-079510 A    4/2011

*Primary Examiner* — Tsion Tumebo
(74) *Attorney, Agent, or Firm* — Oliff PLC

(57) ABSTRACT

A push cart according to one aspect of the present disclosure includes a wheel, a body frame, and a lighting device. The body frame includes a handle portion and rotatably supports the wheel. The body frame is configured to be able to mount a loading platform on the body frame. The handle portion is gripped by a user of the push cart. The lighting device emits light.

8 Claims, 15 Drawing Sheets

(51) Int. Cl.
*F21S 41/32* (2018.01)
*F21S 41/29* (2018.01)

(56) References Cited

U.S. PATENT DOCUMENTS

| | | | | |
|---|---|---|---|---|
| 6,173,799 | B1 * | 1/2001 | Miyazaki | B60L 50/66 |
| | | | | 180/19.3 |
| 6,470,981 | B1 * | 10/2002 | Sueshige | B62B 1/18 |
| | | | | 180/19.3 |
| 6,930,603 | B2 * | 8/2005 | Jackson | G08B 21/0446 |
| | | | | 135/65 |
| 8,608,183 | B2 * | 12/2013 | Woo | A61H 3/00 |
| | | | | 135/67 |
| 8,899,799 | B1 * | 12/2014 | Fairhurst | B62B 9/005 |
| | | | | 362/459 |
| 9,994,273 | B1 * | 6/2018 | Keegan | B62K 11/14 |
| 10,174,932 | B2 * | 1/2019 | Rosenblum | A45B 3/04 |
| 10,246,117 | B1 * | 4/2019 | Chien | B62B 5/0043 |
| 2003/0046834 | A1 * | 3/2003 | Hanafusa | E01H 5/04 |
| | | | | 37/241 |
| 2006/0158868 | A1 * | 7/2006 | Palmer | B62J 6/20 |
| | | | | 362/84 |
| 2008/0237339 | A1 * | 10/2008 | Stawar | B62B 3/1408 |
| | | | | 235/383 |
| 2009/0080207 | A1 * | 3/2009 | Hurwitz | B60Q 1/2615 |
| | | | | 362/464 |
| 2009/0310364 | A1 * | 12/2009 | Turner | A61H 3/04 |
| | | | | 362/253 |
| 2011/0056177 | A1 | 3/2011 | Goto | |
| 2011/0200202 | A1 * | 8/2011 | Flanigan | B60L 3/0015 |
| | | | | 381/61 |
| 2014/0343846 | A1 * | 11/2014 | Goldman | G05D 1/0272 |
| | | | | 701/525 |
| 2014/0366501 | A1 | 12/2014 | Goto | |
| 2016/0176429 | A1 * | 6/2016 | Shirato | A61H 3/04 |
| | | | | 701/22 |
| 2017/0096157 | A1 * | 4/2017 | Kubo | B62B 7/04 |
| 2017/0175997 | A1 * | 6/2017 | Rosenblum | G08B 21/043 |

* cited by examiner

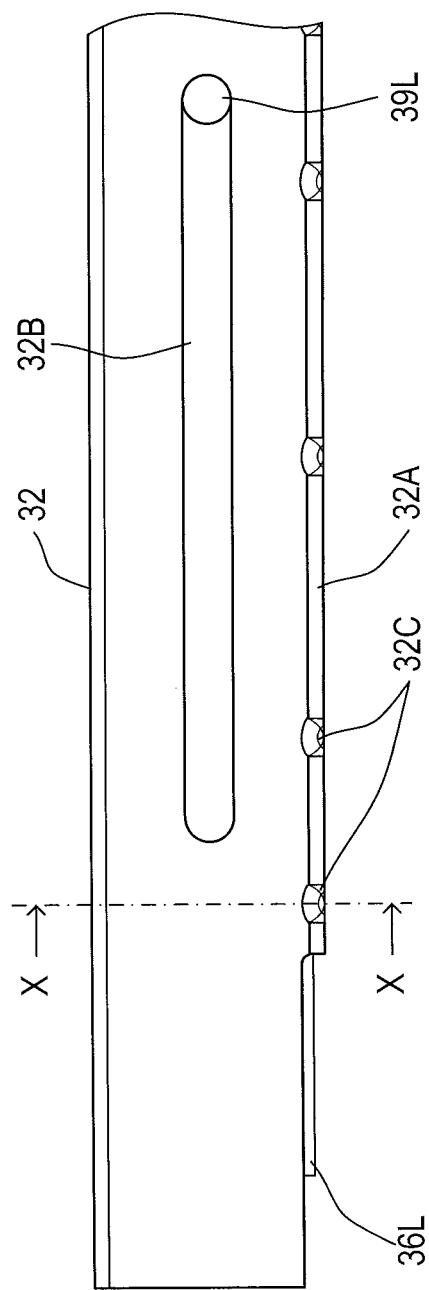
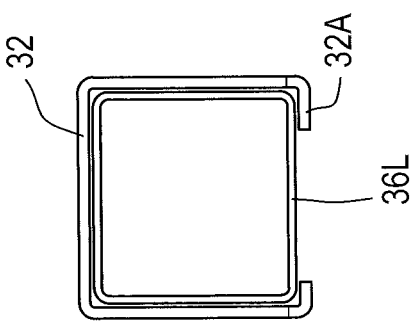
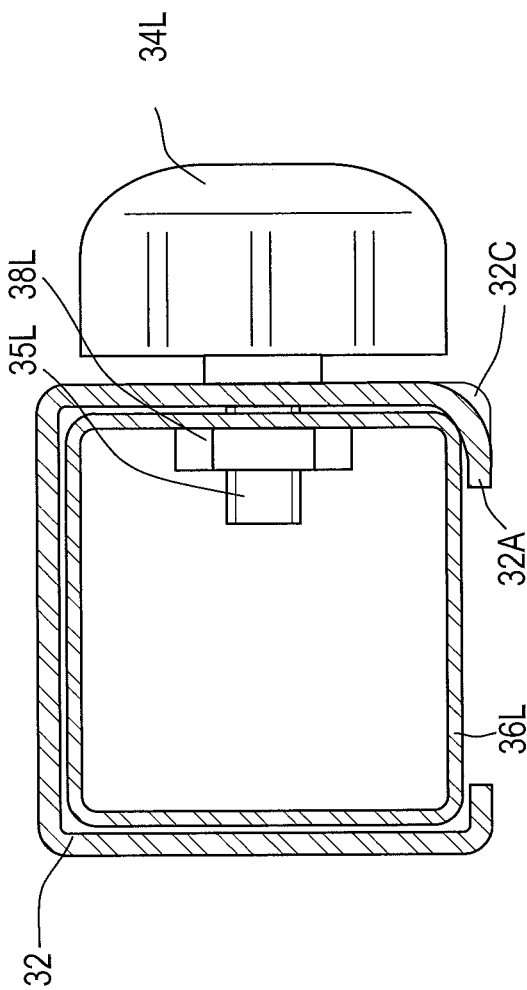

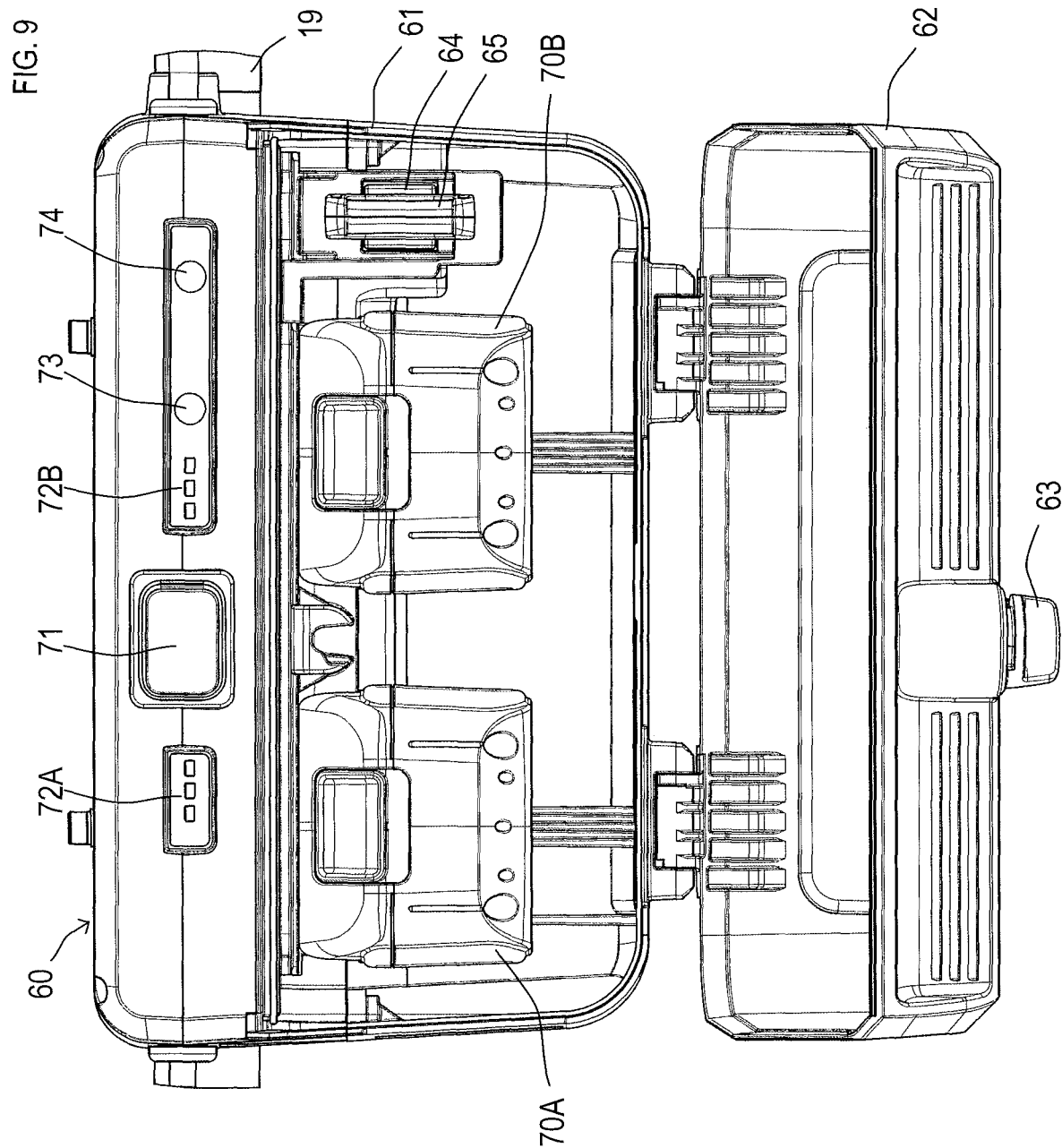

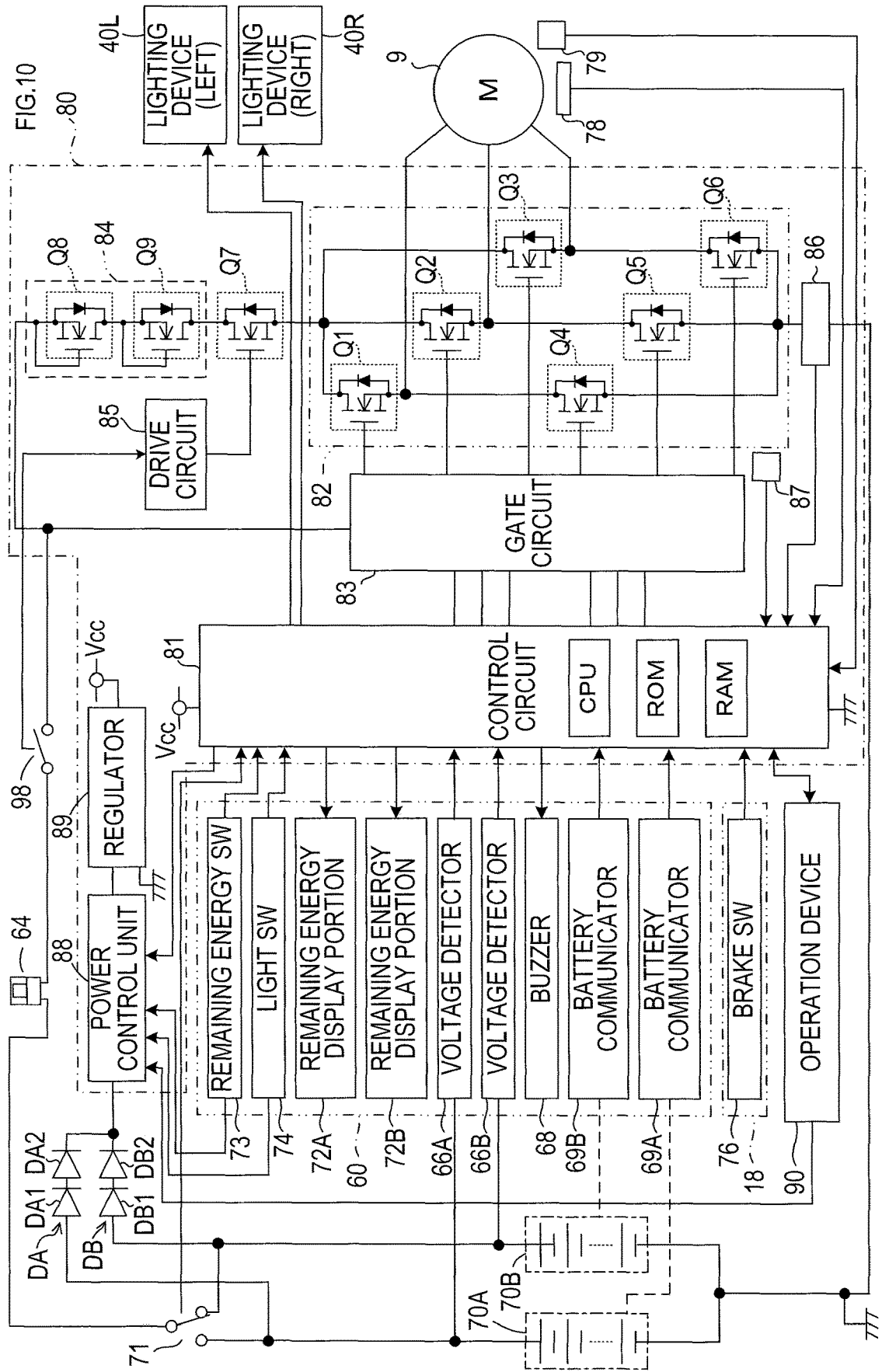

PUSH CART

CROSS-REFERENCE TO RELATED APPLICATIONS

This application claims the benefit of Japanese Patent Application No. 2017-015600 filed on Jan. 31, 2017 with the Japan Patent Office, the entire disclosure of which is incorporated herein by reference.

BACKGROUND

The present disclosure relates to a push cart.

A push cart disclosed in Japanese Unexamined Patent Application Publication No. 2011-079510 includes a body frame, which rotatably supports a wheel and is configured to mount a load platform on the body frame. The body frame extends rearward from left and right sides of the wheel and is raised upward. A rear side of the body frame is bent in a substantially horizontal direction, and functions as two handle portions to be gripped by a user of the push cart with left and right hands. The load platform is provided in front of the handle portions.

SUMMARY

The above-described push cart can carry a load when the user grips the handle portions and pushes the push cart from the rear, with the load placed on the load platform. Carrying is often performed outdoors during the day. Thus, the above-described push cart is not provided with a lighting device that emits light to the surrounding of the push cart.

When carrying outdoors at night, or in a dark place such as a warehouse, the user needs to work with a flashlight illuminating the surrounding, or to install a lighting device in a work site.

It is desirable that a push cart in one aspect of the present disclosure enables a user to perform carrying work in the dark without a separately provided lighting device.

A push cart according to one aspect of the present disclosure includes a wheel, a body frame, and a lighting device. The body frame includes a handle portion, and is configured to rotatably support the wheel. The body frame is further configured such that a loading platform can be mounted on the body frame. The handle portion is configured to be gripped by a user of the push cart. The lighting device is configured to emit light.

In the push cart configured as above, the user may turn on the lighting device (that is, cause light to be emitted) when performing carrying work outdoors at night or in a dark place (for example, in a warehouse). By turning on the lighting device, the user does not need to work with a flashlight or install a lighting device at a work site, or such need is reduced. Therefore, it is possible to improve working efficiency of carrying work at night or in a dark place.

The push cart may further include a ground support portion. The ground support portion supports the push cart in conjunction with the wheel so that the push cart stably stands.

The lighting device may emit the light in a traveling direction of the push cart.

The lighting device may emit light to a forward region in the traveling direction beyond the push cart. In the push cart configured as above, the user can carry more satisfactorily.

The lighting device may be provided on the body frame. In the push cart configured as above, the user can exchange the loading platform to be mounted on the body frame in a state in which the lighting device is attached to the body frame.

The body frame may include a side frame extending substantially in the traveling direction. The lighting device may be provided on the side frame. In the push cart configured as above, it is possible to suppress damage of the lighting device due to hitting an obstacle existing in front of the traveling direction when the user is moving the push cart.

The push cart may further include a motor that is configured to rotationally drive the wheel. In the push cart configured as above, electric power can be supplied to the lighting device from a power source that supplies electric power to drive the motor. Therefore, it is possible to turn on the lighting device without preparing a power source dedicated to the lighting device (for example, a cell battery).

The power source for supplying electric power to the lighting device may be a power generator that is configured to generate electric power by rotation of the wheel.

The push cart may further include a lighting operation portion configured to be operated by the user, and a lighting controller. The lighting controller turns on or off (that is, stops emission of light from) the lighting device in response to operation of the lighting operation portion.

The lighting controller may further turn off the lighting device in response to establishment of a first light-off condition. The first light-off condition may be established in response to a continuous stop of the push cart for a certain period of time in a state in which the lighting device is on.

In the push cart configured as such, the user can turn on or off the lighting device by operating the lighting operation portion. Further, when the push cart is stopped for the certain time or more in a state in which the lighting device is on, the lighting device is automatically turned off.

While the push cart is pushed and moved by the user, the lighting device is not turned off since the first light-off condition is not established. Thus, usability of the push cart is improved.

For example, the lighting controller may basically turn off the lighting device when the lighting device is turned on continuously for a specified period of time. The lighting controller may extend the specified period of time before turning off the lighting device in a case in which the push cart is moved before the specified period of time elapses. The specified period of time may be counted again from the beginning when the push cart is stopped.

The lighting controller may further notify the user of turning-off of the lighting device in response to establishment of a light-off notification condition. The light-off notification condition may be established in response to a continuous stop of the push cart for a certain period of time in a state in which the lighting device is on.

The lighting controller may notify the user of turning-off of the lighting device by blinking the lighting device. Alternatively, the lighting controller may notify the user of turning-off of the lighting device by reducing illuminance of the light.

The lighting controller may further turn off the lighting device in response to establishment of a second light-off condition. The second light-off condition may be established in response to a continuous stop of the push cart for a specified wait time after the light-off notification condition is established.

In the push cart configured as above, when the push cart is stopped continuously for the certain period of time in a state in which the lighting device is on, the user is notified that the lighting device is going to be turned off. Based on the notification, the user know that the lighting device is about to be turned off.

Therefore, in a case in which the notification is received, the user who wishes the lighting device to be continuously lit, for example, may operate the lighting operation portion or move the push cart, so as to turn on the lighting device normally, and continue the normally lit state.

The push cart may further include a cart operation portion configured to be operated by the user, a cart controller, and a power source portion. The cart controller controls the push cart in accordance with operation of the cart operation portion. The power source portion supplies electric power to the cart controller.

The cart controller may reduce power consumption in the cart controller in response to establishment of a power consumption reduction condition. The power consumption reduction condition may be established in response to a continuous stop of the push cart for a certain period of time.

The cart controller may reduce power consumption by cutting off electric power supplied from the power source portion to the cart controller. Alternatively, the cart controller may reduce power consumption by switching an operation mode of the cart controller to a low power consumption mode.

In the push cart configured as above, even if a state in which the cart operation portion is not operated continues for the certain period of time, the cart controller operates normally and continues control of the push cart when the push cart is pushed and moved by the user during the certain period of time.

Therefore, it is possible to reduce non-performance of normal control by the cart controller when the user grips the handle portion and pushes the push cart. Usability of the push cart can be improved.

BRIEF DESCRIPTION OF THE DRAWINGS

Example embodiments of the present disclosure will be described hereinafter with reference to the accompanying drawings, in which:

FIG. 5A is a front view of the rear wheel frame seen from a rear of the push cart, FIG. 5B is a left side view of the rear wheel frame, and FIG. 5C is a cross-sectional view taken along a line X-X of the rear wheel frame shown in FIG. 5A;

FIG. 9 is a plan view of the battery box with a lid opened;

FIG. 10 is a block diagram showing an overall configuration of an electric system of the push cart according to the embodiment;

DETAILED DESCRIPTION OF THE PREFERRED EMBODIMENTS

Figure 1:
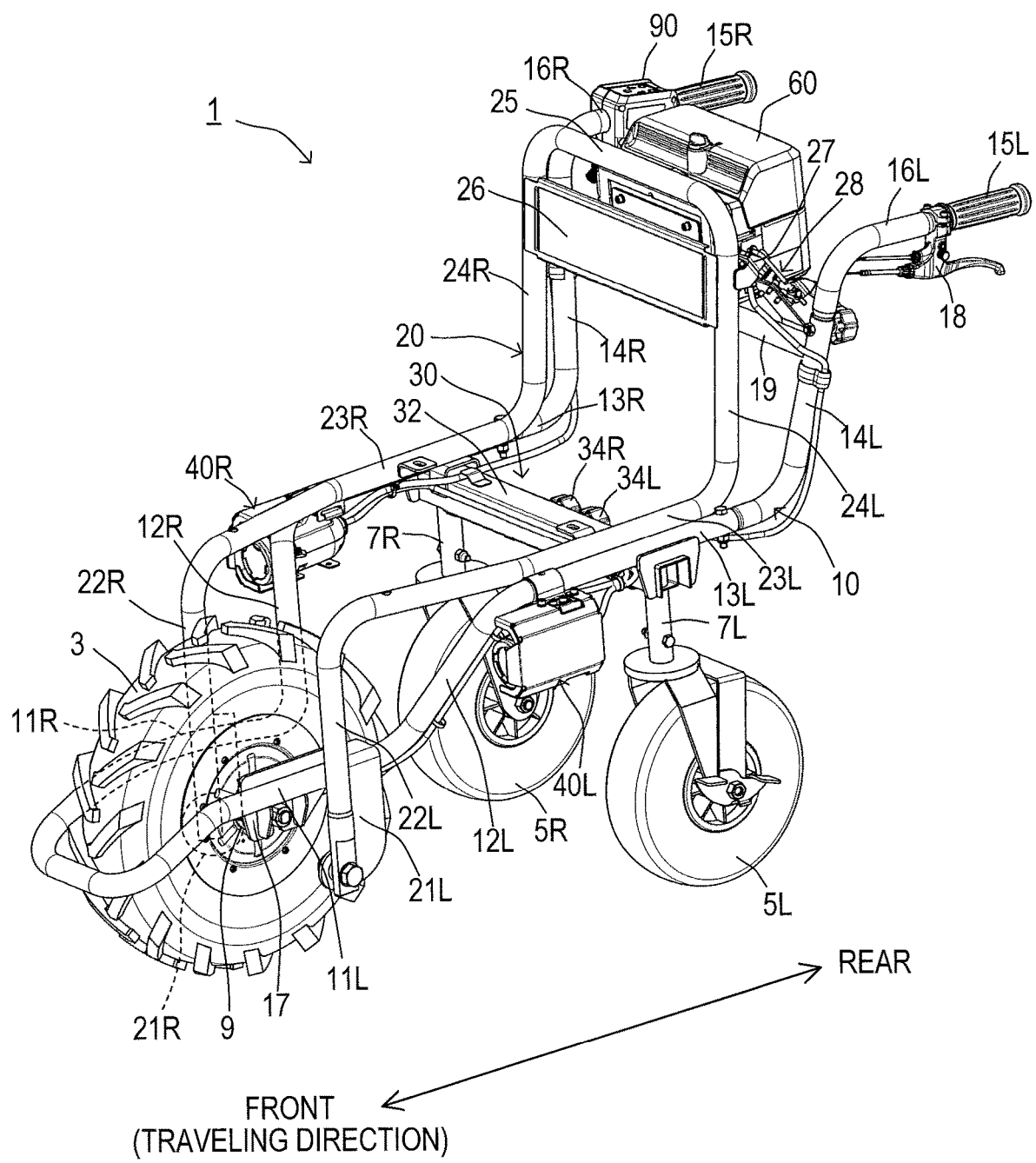
FIG. 1 is a perspective view showing a push cart according to an embodiment.

As shown in FIG. 1, a push cart 1 of the present embodiment (hereinafter, generally referred to as "cart 1") includes a front wheel 3, and rear wheels 5L, 5R. The front wheel 3 is a driving wheel, and the rear wheels 5L, 5R are driven wheels. That is, the cart 1 is configured as a tricycle. The front wheel 3 corresponds to an example of a wheel of the present disclosure, and each of the rear wheels 5L, 5R corresponds to an example of ground support portion of the present disclosure.

A suffix "L" in the rear wheel 5L represents left (indicates that the wheel is located on the left side facing the front in a traveling direction of the cart 1), and a suffix "R" in the rear wheel 5R represents right (indicates that the wheel is located on the right side facing the front in the traveling direction of the cart 1). The same applies to suffixes "L" and "R" in the following description. Also, the "front" represents the front of the traveling direction, and the "rear" represents the rear of the traveling direction.

The cart 1 includes a body frame 10, and a load platform frame 20. The body frame 10 rotatably supports the wheels 3, 5L, 5R. A load platform is fixed to the load platform frame 20. A load is placed on the load platform. The load platform is fixed on the body frame 10 via the load platform frame 20.

Figure 2B:
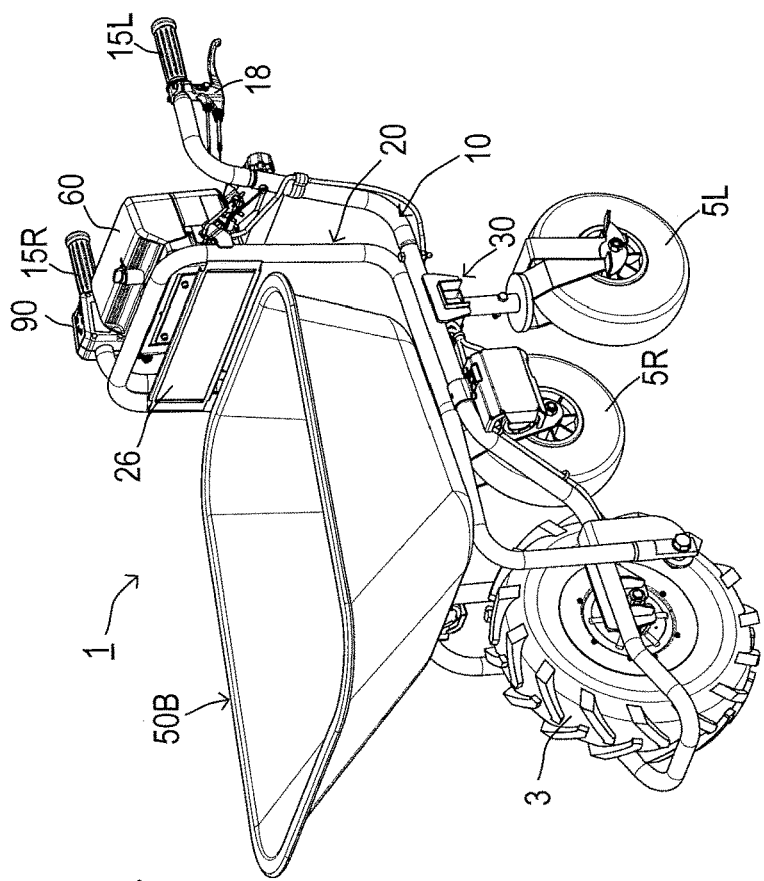
FIG. 2B is a perspective view showing the push cart with a load platform configured by a press-formed metal plate.
Figure 2A:
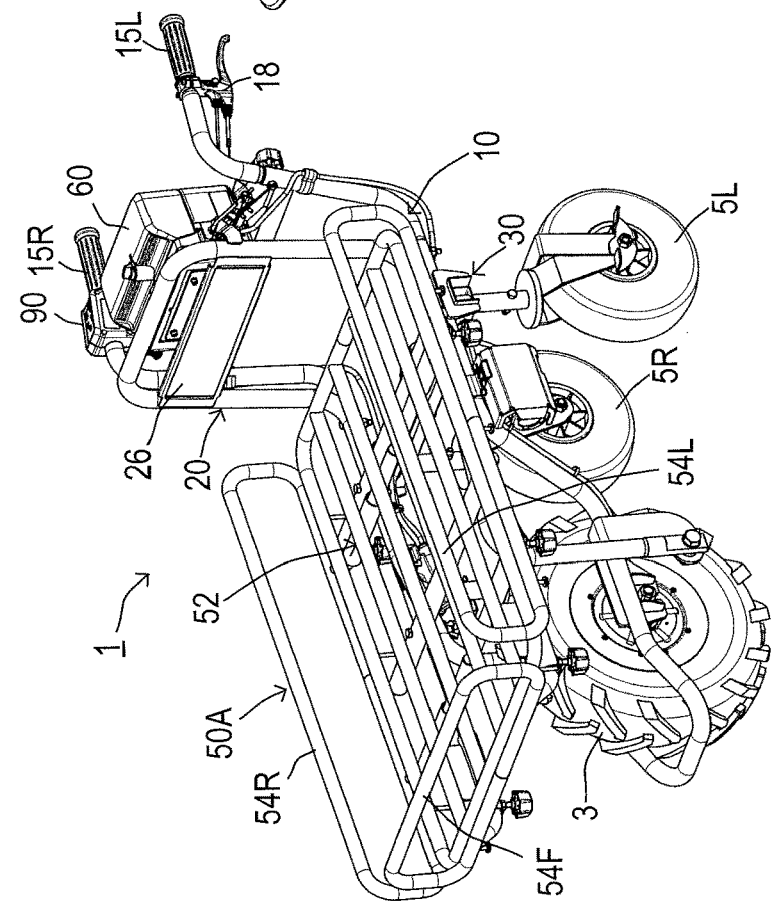
FIG. 2A is a perspective view showing the push cart with a load platform configured by pipes.

The load platform frame 20 is configured to fix a variety of load platforms such as a load platform 50A shown in FIG. 2A or a load platform 50B shown in FIG. 2B. The load platform 50A is configured as a "palette" which includes intercoupled pipes. The load platform 50B is configured as a "bucket" which includes a press-formed steel plate. Therefore, a user of the cart 1, when performing carrying work with the cart 1, can select a load platform to be used in accordance with the work detail.

The load platform 50A includes a load platform body 52, and frame bodies 54F, 54L, 54R. The load platform body 52 includes pipes that are spaced apart from one another. These pipes form a mounting surface on which a load is placed. The frame bodies 54F, 54L, 54R are arranged to be higher than the mounting surface of the load platform body 52 in the front, right and left of the load platform body 52.

Each of the frame bodies 54F, 54L, 54R is formed into an annular shape. Specifically, each of the frame bodies 54F, 54L, 54R includes a first pipe, a second pipe, a third pipe, and a fourth pipe. Each of the first pipe, the second pipe, the third pipe, and the fourth pipe has an elongated shape. The first pipe and the second pipe has the same length. Each of the third pipe and the fourth pipe has the same length that is shorter than the first pipe. The first pipe and the second pipe are spaced apart from one another in a vertical direction and arranged along an outer periphery of the load platform body 52. First ends and second ends of the first and the second pipes are coupled to each other by the third and the fourth pipes. A height of the first pipe from the mounting surface is defined by a length of the third and the fourth pipes.

Figure 3:
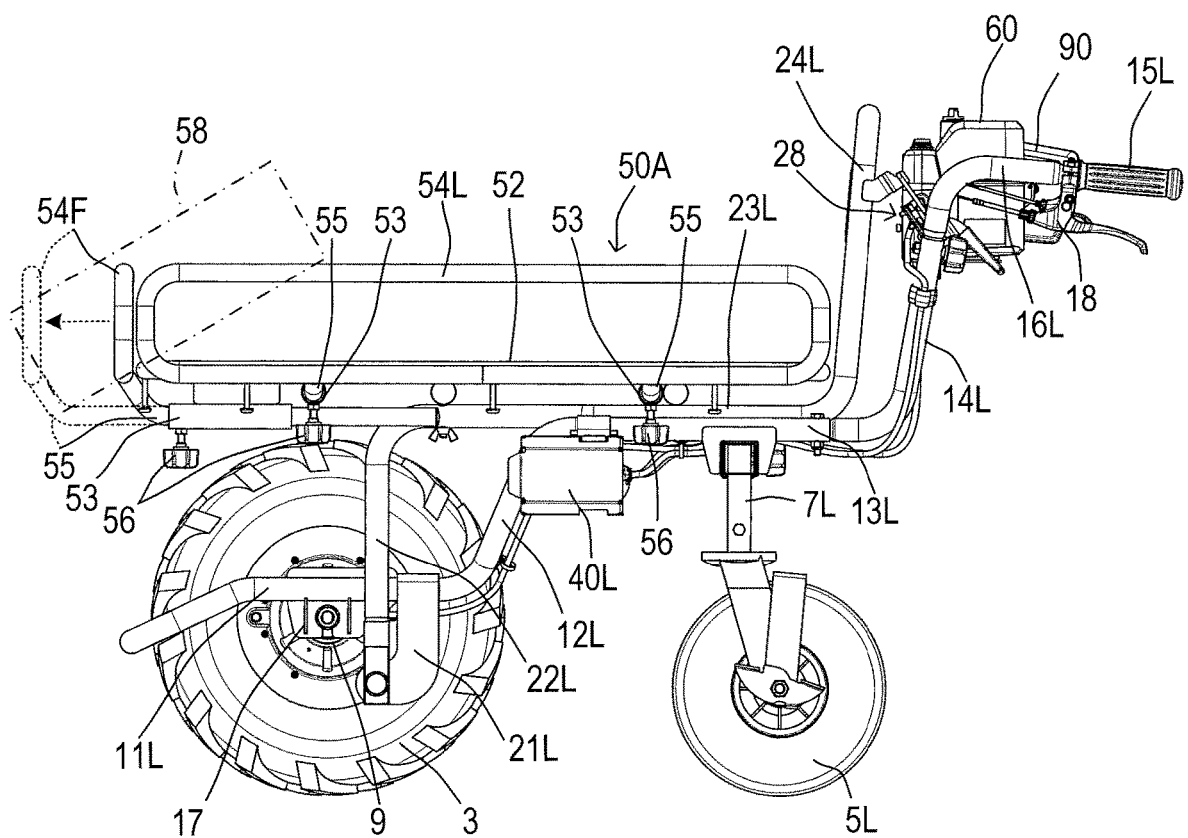
FIG. 3 is an explanatory diagram showing a configuration of the load platform shown in FIG. 2A.

As shown in FIG. 3, each of the frame bodies 54F, 54L, 54R includes two attachment pipes 55. The load platform body 52 includes fixing pipes 53 below the pipes forming the mounting surface. Two of the fixing pipes 53 are provided at positions corresponding to the attachment pipes 55 in the frame body 54F. Another two of the fixing pipes 53 are provided at positions corresponding to the attachment pipes 55 in the frame body 54L. Further another two of the fixing pipes 53 are provided at positions corresponding to the attachment pipes 55 in the frame body 54R. The frame bodies 54F, 54L, 54R are supported by the load platform body 52, with the attachment pipes 55 inserted into the corresponding fixing pipes 53. Further, amounts of protrusion of the respective frame bodies 54F, 54L, 54R to the front, right and left from the load platform body 52 are adjusted by amounts of insertion of the attachment pipes 55 into the fixing pipes 53.

Each of the fixing pipes 53 include a screw 56 for positioning the attachment pipe 55 inserted into the fixing pipe 53. A diameter of a head of the screw 56 is large so as to be held to be rotated by the user. The user, after adjusting the amounts of protrusion from the load platform body 52 of the frame bodies 54F, 54L, 54R, can hold the heads of the associated screws 56 to fasten the associated screws 56, so as to fix the frame bodies 54F, 54L, 54R to the load platform body 52.

As shown by an arrow in FIG. 3, for example, when the frame body 54F is fixed to the load platform body 52 in a state pulled out in front of the load platform body 52, there is a gap between the mounting surface of the load platform body 52 and the frame body 54F.

However, in the present embodiment, each of the frame bodies 54F, 54L, 54R has an annular shape. That is, each of the frame bodies 54F, 54L, 54R includes not only the first pipe disposed at a position higher than the mounting surface of the load platform body 52, but also the second pipe disposed substantially flush with the mounting surface of the load platform body 52.

Therefore, as shown in FIG. 3, even if the load 58 is tilted by the gap between the frame body 54F and the load platform body 52, the load 58 comes into contact with the second pipe of the frame body 54F, and is suppressed from falling off from the load platform 50A.

Each of the body frame 10 and the load platform frame 20 includes a bent metal-made, rod-shaped pipe member. In the body frame 10 and the load platform frame 20, the rod-shaped pipe member is arranged so as to clamp the front wheel 3, and also arranged to be symmetrical about a plane of rotation of the front wheel 3.

That is, the body frame 10 is bent into a U-shape, and is arranged in the cart 1 so that a U-shaped bent portion is positioned in front. The front wheel 3 is arranged so as to be enclosed by the U-shaped bent portion of the body frame 10 at a front end portion of the cart 1.

The body frame 10 includes front wheel support portions 11L, 11R, inclined portions 12L, 12R, mounting portions 13L, 13R, inclined portions 14L, 14R, and handle portions 16L, 16R.

The front wheel support portions 11L, 11R are provided behind the U-shaped bent portion.

The front wheel support portions 11L, 11R clamp a rotation center portion of the front wheel 3 from the left and right, and hold a motor 9 assembled to the rotation center portion of the front wheel 3. Therefore, the front wheel 3 is rotatably fixed to the front wheel support portions 11L, 11R and is rotationally driven by the motor 9.

The inclined portions 12L, 12R extend rearward from the front wheel support portions 11L, 11R of the body frame 10, so as to be raised obliquely upwards while being spread to the left and right about the front wheel 3.

The mounting portions 13L, 13R substantially horizontally extend rearward of the inclined portions 12L, 12R. The mounting portions 13L, 13R extend substantially in the traveling direction of the cart 1. The load platform frame 20 is mounted on the mounting portions 13L, 13R. Each of the mounting portions 13L, 13R corresponds to an example of a side frame of the present disclosure.

A rear wheel frame 30 is provided between the mounting portions 13L, 13R. The load platform frame 20 is mounted on the rear wheel frame 30. The rear wheel frame 30 supports the rear wheels 5L, 5R.

The rear wheel frame 30 includes a frame body 32 and fixing members 34L, 34R. The frame body 32 fixes the rear wheel support portions 7L, 7R so that the rear wheel support portions 7L, 7R are slidable in a transverse direction to the traveling direction to adjust a width between the rear wheels 5L, 5R, and/or to compensate for transversely asymmetric loads. The rear wheels 5L, 5R are rotatably fixed to the rear wheel support portions 7L, 7R, respectively. The fixing members 34L, 34R position the rear wheel support portions 7L, 7R with respect to the frame body 32.

Figure 4:
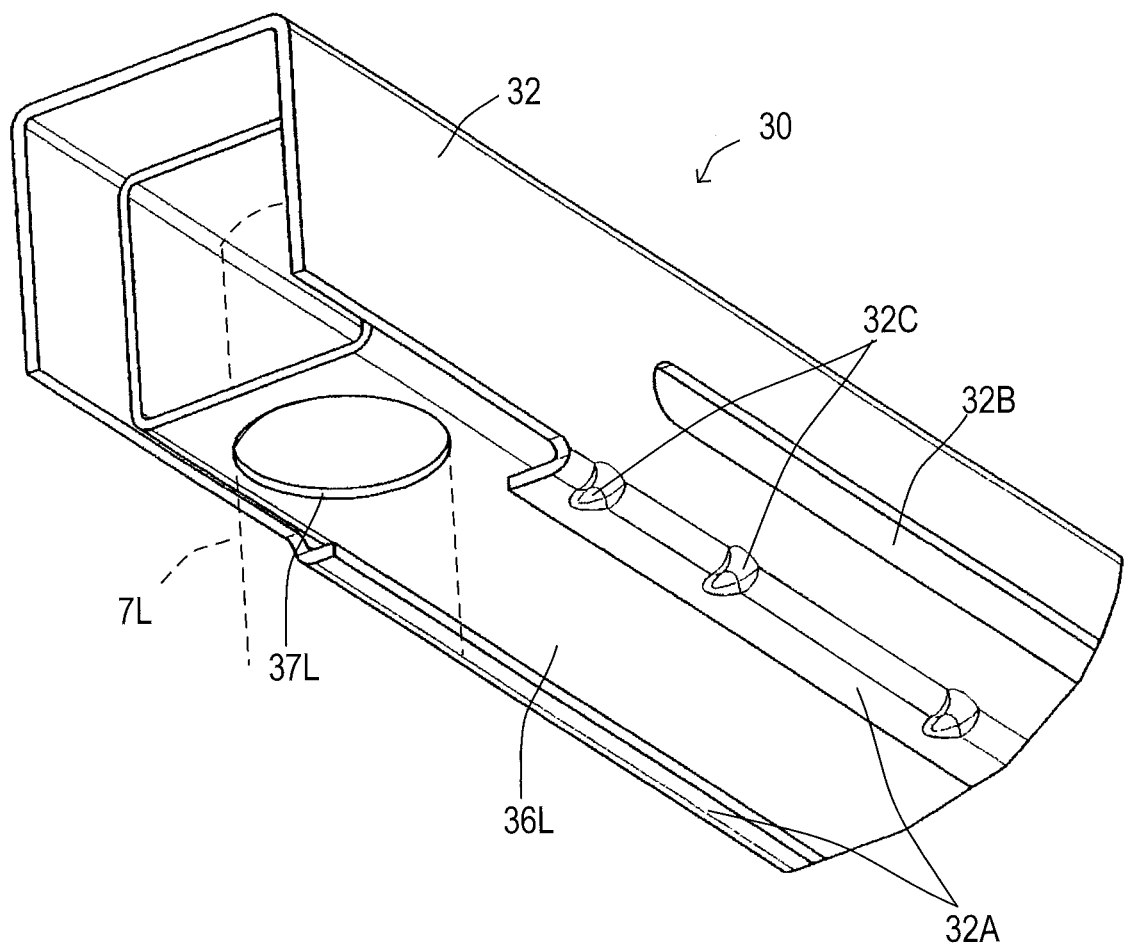
FIG. 4 is a perspective view showing a portion of a rear wheel frame to which a left rear wheel is supported.

The frame body 32 is disposed below the mounting portions 13L, 13R. An upper surface of the frame body 32 is fixed to the mounting portions 13L, 13R. As shown in FIGS. 4 and 5C, the frame body 32 is an elongated member having an open lower surface and a U-shaped upper surface. In other words, the frame body 32 is an open channel cross beam.

As shown in FIGS. 4 and 5A to 5C, the frame body 32 includes a top surface, a first sidewall and a second sidewall hanging downward from the top surface. The frame body 32 is disposed so that the first sidewall faces the front of the cart 1 and the second sidewall faces the rear of the cart 1. At a lower end of each of the first and second sidewalls, a bent portion 32A is provided which is bent toward the facing sidewall to be parallel to the upper surface of the frame body 32.

A tubular member 36L is provided in a space enclosed by the bent portion 32A, the upper surface, and the first and second sidewalls. The tubular member 36L is slidable along a center axis of the tube. The rear wheel support portion 7L is fixed to the tubular member 36L. The tubular member 36L is provided in a left-side region in the above-described space of the frame body 32. In a right-side region in the space of the frame body 32, a not shown tubular member is provided so as to be slidable along a center axis of the tube. The rear wheel support portion 7R is fixed to the not shown tubular member.

FIGS. 4 and 5A to 5C show a left-side portion of the rear wheel frame 30 to which the left-side rear wheel support portion 7L is slidably fixed. A right-side portion to which the right-side rear wheel support portion 7R is slidably fixed is omitted. However, the right-side portion has the same configuration as the left-side portion. Therefore, in the following description, not-shown components of the rear wheel frame 30 in the right-side portion will not be explained, and components in the left-side portion including the tubular member 36L will be explained with reference to FIGS. 4 and 5A to 5C.

The tubular member 36L is an elongated pipe-like member extending in the transverse direction of the cart 1. An attachment hole 37L (see FIG. 4) is provided on a lower surface at a left end of the tubular member 36L. The rear wheel support portion 7L (shown in FIG. 4 by dashed lines, also see FIG. 3) is fixed to the attachment hole 37L so as to protrude downward from the attachment hole 37L.

Further, a screw hole 39L is provided at an inner end of the tubular member 36L opposite to the end provided with the attachment hole 37L. A bolt 35L provided to the fixing member 34L is inserted to the screw hole 39L. The bolt 35L inserted to the screw hole 39L is screwed to a nut 38L inside the tubular member 36L.

The screw hole 39L is provided on a rear sidewall of the tubular member 36L, so that the bolt 35L of the fixing member 34L can be inserted from the rear of the cart 1.

A long hole 32B is provided on the second sidewall of the frame body 32 facing the rear sidewall. The long hole 32B is provided to pass the bolt 35L of the fixing member 34L through the screw hole 39L of the tubular member 36L from outside of the frame body 32.

The long hole 32B is provided at a position facing the tubular member 36L. The bolt 35L is inserted through the long hole 32B and the screw hole 39L from outside of the frame body 32, and is screwed into the nut 38L inside the tubular member 36L. The long hole 32B enables the tubular member 36L to slide inside the frame body 32 in a state in which the bolt 35L is screwed into the nut 38L.

In the fixing member 34L, a head of the bolt 35L, like the head of the screw 56, has a large diameter so that the user can hold to rotate. The user can hold the head of the bolt 35L to screw the bolt 35L into the nut 38L manually.

The user, by loosening the fastening of the fixing member 34L to the nut 38L, can slide the tubular member 36L with respect to the frame body 32 so as to freely set a position of the rear wheel 5L supported by the rear wheel support portion 7L. The user can also slide a not shown tubular member to which the rear wheel support portion 7R is fixed so as to freely set a position of the rear wheel 5R supported by the rear wheel support portion 7R. Thereby, the user can freely set an interval between the rear wheels 5L, 5R.

The user, after setting the position of the rear wheel 5L, can fasten the fixing member 34L to the nut 38L to position the rear wheel 5L.

In positioning the rear wheel 5L as above, simply clamping the second sidewall of the frame body 32 and the rear sidewall of the tubular member 36L between the fixing member 34L and the nut 38L may cause loosening of the fastening of the tubular member 36L to the frame body 32 due to vibration or the like.

In contrast, in order to make the fastening of the tubular member 36L to the frame body 32 by the fixing member 34L and the nut 38L difficult to loosen, for example, dimensional accuracy of the frame body 32 and the tubular member 36L may be increased, so that there is no gap between the second sidewall of the frame body 32 and the rear sidewall of the tubular member 36L.

However, this makes it difficult for the tubular member 36L to slide in the frame body 32, making it difficult to adjust the position of the rear wheel 5L.

Therefore, in the present embodiment, recesses 32C are dispersedly provided at a corner between the second sidewall provided with the long holes 32B and the bent portion 32A of the frame body 32. The recesses 32C, for example, are driven inward from outside of the frame body 32 by a press or the like. These recesses 32C protrude inwardly toward the tubular member 36L.

When the tubular member 36L is fastened to the frame body 32 by the fixing member 34L and the nut 38L, portions corresponding to the recesses 32C on an inner wall of the frame body 32 function as wedges that bite into the corner of the tubular member 36L. Further, lower corners of the tubular member may have indentations or recesses configured to mate with the recesses 32C (that protrude inwardly).

Therefore, according to present embodiment, after the user positions the rear wheel 5L by the fixing member 34L, it is possible to suppress loosening of the fastening of the tubular member 36L to the frame body 32 due to vibration or the like, thereby to suppress moving along the axis of the tubular member 36L inside the frame body 32.

In the body frame 10, the inclined portions 14L, 14R extends further obliquely rearward of the mounting portions 13L, 13R, so as to be raised up to a height at which the user can push the cart 1 with two hands.

In the body frame 10, the handle portions 16L, 16R extends substantially horizontally further rearward of the inclined portions 14L, 14R. Grips 15L, 15R to be held by the user are attached to rear ends of the handle portions 16L, 16R.

A braking device 17 for applying a braking force to the front wheel 3 is provided on the left-side front wheel support portion 11L of the body frame 10. A brake lever 18 is provided in the left-side handle portion 16L. The user can operate the brake lever 18 to operate the braking device 17 manually.

An operation device 90 is provided in the right-side handle portion 16R of the body frame 10. The user can operate the operation device 90 to set driving conditions of the motor 9 or to drive the motor 9.

A fixed frame 19 is provided between the inclined portions 14L, 14R of the body frame 10. A battery box 60 is fixed to the fixed frame 19. The battery box 60 accommodates two battery packs as power sources of the cart 1. The battery box 60 is arranged between the handle portions 16L, 16R.

The lighting devices 40L, 40R are respectively provided to the mounting portions 13L, 13R of the body frame 10. The lighting device 40L emits light from the left side of cart 1 to the front of the cart 1. The lighting device 40R emits light from the right side of the cart 1 to the front of the cart 1. The light emitted from the lighting devices 40L, 40R is emitted at least to a forward region beyond the cart 1.

Figure 6:
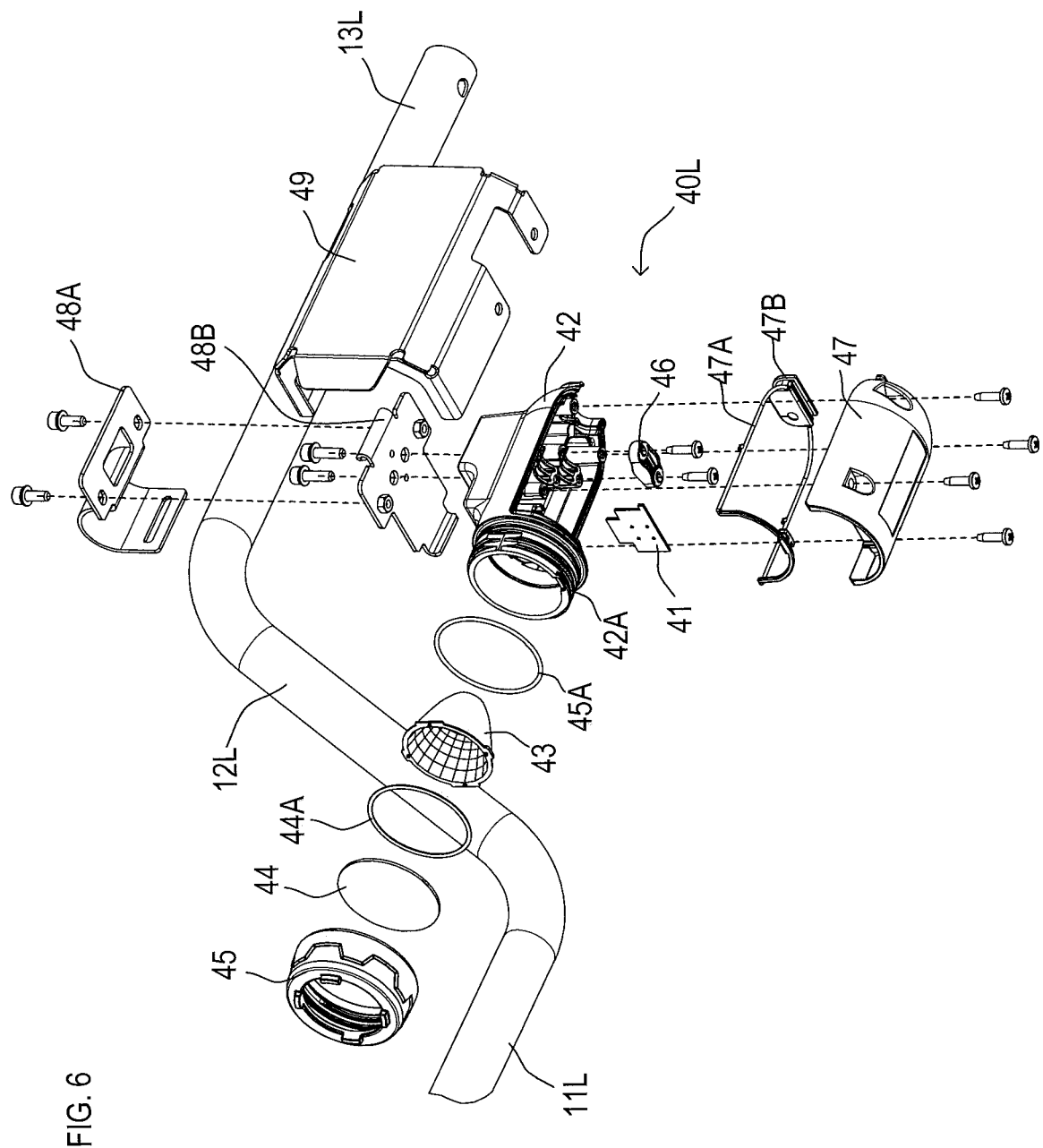
FIG. 6 is an exploded perspective view of a lighting device.

Each of the lighting devices 40L, 40R includes a not shown light emitting diode (LED) as a light source, and is configured as shown in FIG. 6.

FIG. 6 shows the lighting device 40L fixed to the left-side mounting portion 13L of the body frame 10. The lighting device 40R fixed to the right-side mounting portion 13R basically has the same configuration as the left-side lighting device 40L. Therefore, in the following description, a configuration of the left-side lighting device 40L will be described with reference to FIG. 6, and a description of the configuration of the right-side lighting device 40R will be omitted.

As shown in FIG. 6, the lighting device 40L includes an LED board 41 on which a LED (not shown) is mounted, and a case 42 that accommodates the LED board 41. The case 42 is configured into a semi-cylindrical shape formed by dividing a cylindrical member into two along a center axis, and has an annular portion 42A at a first open end.

In the case 42, the annular portion 42A is open so that light from the LED is emitted through the opening. A reflector 43 is provided in the annular portion 42A. The reflector 43 reflects light emitted from the LED and emits the reflected light from an opening of the reflector 43.

A disc-shaped protective plate 44 is provided on an open end face of the reflector 43, with an annular-shaped packing 44A interposed therebetween. The protective plate 44 is made of light transmissive glass or synthetic resin.

An annular-shaped cover 45 is screwed into the annular portion 42A of the case 42. The cover 45 covers the reflector 43, the packing 44A, and the protective plate 44, and fixes these members to the annular portion 42A. An annular-shaped packing 45A is provided between the cover 45 and an outer peripheral end face of the annular portion 42A. The packing 45A suppresses entering of rain, dust, etc. into the casing 42 from the annular portion 42A.

A semi-cylindrical (lower) cover 47 is provided at an opening portion behind the annular portion 42A of the case 42, with a waterproof/dustproof packing 47A interposed therebetween. Therefore, when the cover 47 is screwed upwardly to the case 42, entering of water into the case 42 is suppressed.

The case 42 and the cover 47 are configured to have a smaller diameter at rear end portions relative to their front end portions for light emission from the LEDs. A packing 47B is provided at open ends of the rear end portions of the case 42 and the cover 47. The packing 47B closes the open ends of the rear end portions of the case 42 and the cover 47. A not shown signal line coupled to the LED board 41 and a power line are inserted into the packing 47B.

A fixing member 46 is provided inside the case 42, separately from the LED board 41. The not shown signal line coupled to the LED board 41 is fixed to the fixing member 46 by a screw.

The lighting device 40L is fixed to the left-side mounting portion 13L of the body frame 10. More specifically, fixing members 48A, 48B are attached to the mounting portion 13L by screws, so as to clamp the mounting portion 13L therebetween. The lighting device 40L is attached to the fixing member 48B by screws.

A protective cover 49 is attached to the fixing members 48A, 48B. The lighting device 40L is covered with the protective cover 49 from outside of the cart 1 to be protected from outside of the cart 1.

Therefore, when the cart 1 is tilted to the left or right, or the cart 1 is overturned during traveling of the cart 1, the protective cover 49 protects the lighting device 40L from directly hitting an object around the cart 1 or a road surface.

A fixing member 21L is fixed to the front wheel support portion 11L. A fixing member 21R is fixed to the front wheel support portion 11R.

The load platform frame 20 is rotatably fixed with respect to the body frame 10. Specifically, each of the fixing members 21L, 21R has a fixing axis parallel to an axle of the front wheel 3 at a position lower than the axle of the front wheel 3. A front-side end portion of the load platform frame 20 is supported by the fixing axes of the fixing members 21L, 21R. The load platform frame 20 is rotatable about the fixing axes.

The load platform frame 20 includes coupling portions 22L, 22R, load platform fixing portions 23L, 23R, rising portions 24L, 24R, and a coupling portion 25.

The coupling portions 22L, 22R are rotatably fixed to the fixing members 21L, 21R at first ends. In a state in which the load platform frame 20 is mounted on the body frame 10, the coupling portions 22L, 22R rise substantially vertically to a position higher than the front wheel 3 from the ends fixed to the fixing members 21L, 21R. Heights of second ends of the coupling portions 22L, 22R are heights at which the load platform fixing portions 23L, 23R extending from the second ends can be mounted on the mounting portions 13L, 13R of the body frame 10.

The load platform fixing portions 23L, 23R are bent at a substantially right angle and extend rearward from the second ends of the coupling portions 22L, 22R. The load platform fixing portions 23L, 23R extend along the mounting portions 13L, 13R of the body frame 10 from the second ends of the coupling portions 22L, 22R, and are mounted on the mounting portions 13L, 13R, as shown in FIG. 1.

The rising portions 24L, 24R rise and extend straight upward from the load platform fixing portions 23L, 23R in front of the inclined portions 14L, 14R of the body frame 10. Ends of the rising portions 24L, 24R opposite to the load platform fixing portions 23L, 23R are coupled with the coupling portion 25. The coupling portion 25 is disposed substantially at the same height as the battery box 60.

A protective cover 26 is provided between the rising portions 24L, 24R below the coupling portion 25. The protective cover 26 protects a load placed on the load platform mounted on the load platform frame 20 from hitting the battery box 60.

The user can lift up the coupling portion 25 to rotate the load platform frame 20 to the front so as to incline the load platform fixed to the load platform fixing portions 23L, 23R to the front.

Thus, the user can drop the load to the front of the cart 1 as required. Here, assume that the load platform frame 20 is not fixed to (locked to or hooked to) the body frame 10. In this case, when the cart 1 is moved, the load platform frame 20 may be displaced up and down.

Therefore, in the present embodiment, an engaging member 28 is provided in the fixed frame 19. A hook 27 is provided at the left-side rising portion 24L of the load platform frame 20. When the engaging member 28 is engaged with the hook 27, the load platform frame 20 is fixed to the body frame 10. The engaging member 28 is provided with an operation lever for the user to manually engage the engaging member 28 with the hook 27 or to release the engagement. A supplemental hook may be provided on the right side for additional security.

Figure 7:
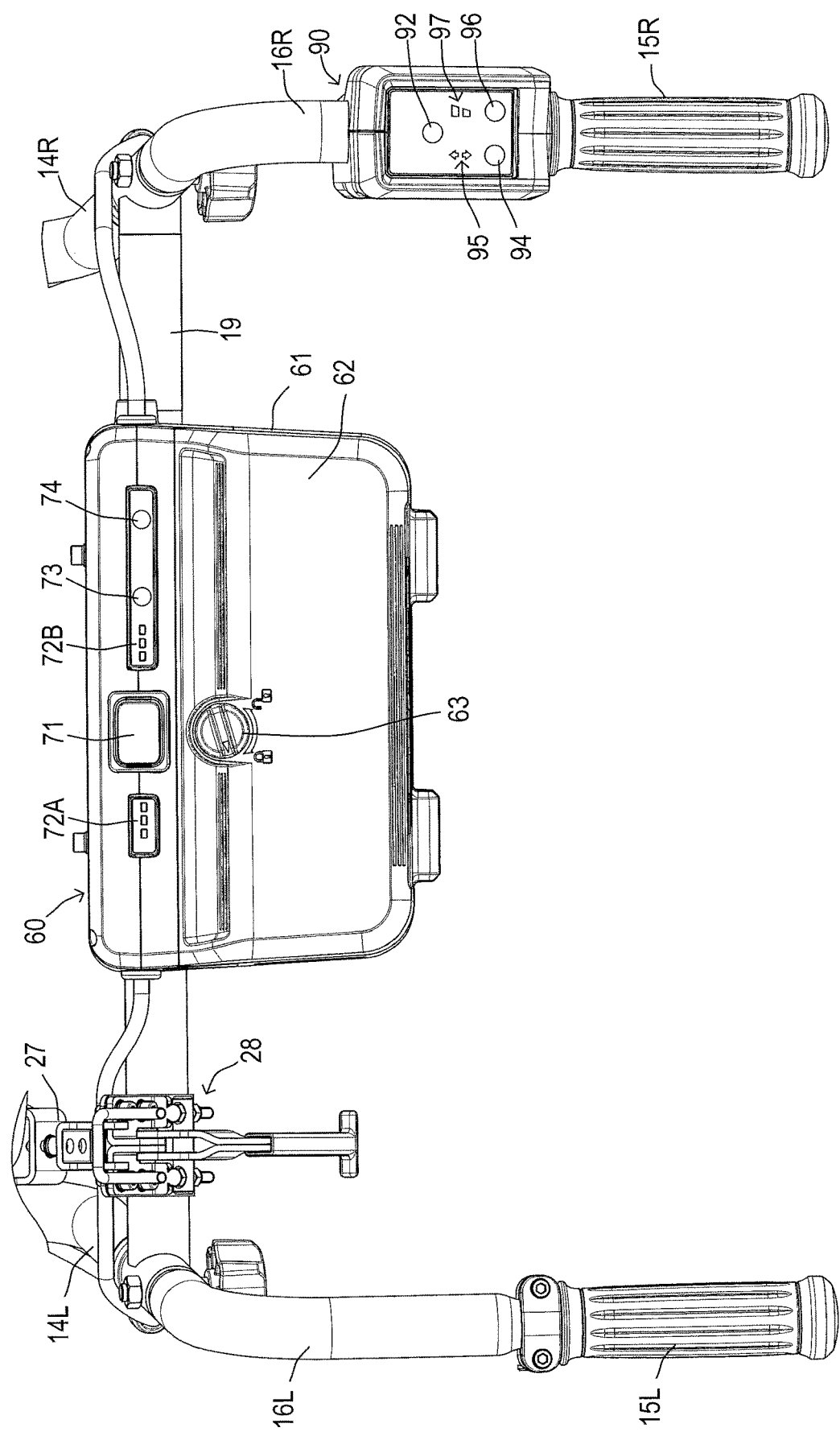
FIG. 7 is a plan view of a battery box.
Figure 8:
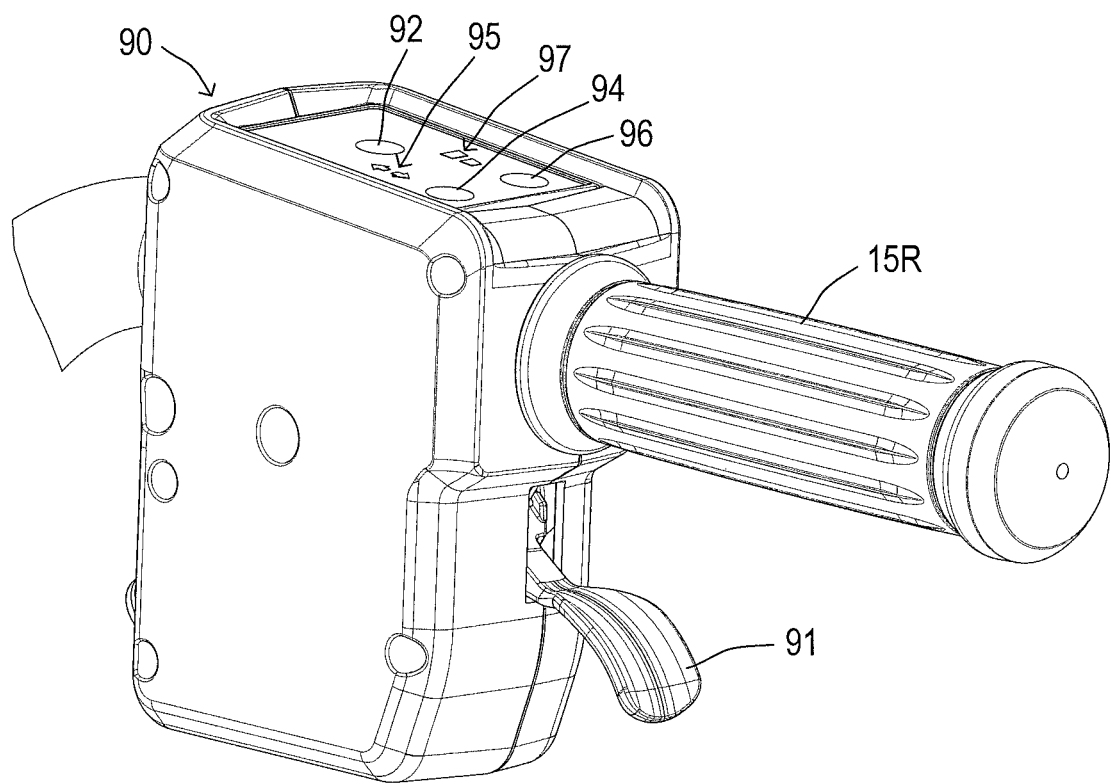
FIG. 8 is a perspective view of an operation device.

FIGS. 7 and 8 illustrate the operation device 90 and the battery box 60. The operation device 90 is provided at the right-side handle portion 16R of the body frame 10. The operation device 90 is operated by the user of the cart 1 to drive the motor 9. The battery box 60 is disposed between the right and left handle portions 16L, 16R.

As shown in FIGS. 7 and 8, the operation device 90 includes a case attachable to the handle portion 16R. A drive lever 91 and a main power switch 92 are assembled to the case.

The main power switch 92 is arranged on an upper surface of the case, so that the user can operate (depress) the main power switch 92 from above the handle portion 16R.

The drive lever 91 is a so-called trigger operated by a finger of the user holding the grip 15R. The user instructs a rotation speed of the motor 9 (in other words, traveling speed of the cart 1) by an operation amount of the drive lever 91. The drive lever 91 protrudes rearward from a lower side of the case. A twisting motion of the grip 15R in a first rotational direction may also be used as a trigger, similar to a motorcycle grip throttle (not shown).

A direction switch 94, a direction display portion 95, a speed switch 96, and a speed display portion 97 are provided on the upper surface of the case, as well as the main power switch 92.

The direction switch 94 is a switch to set a traveling direction of the cart 1 to either forward or rearward. Every time the direction switch 94 is operated (depressed), the traveling direction of the cart 1 (specifically, rotation direction of the motor 9) is switched. Rotation of the grip 15R in a second rotational direction may switch the traveling direction.

The traveling direction of the cart 1, which is set through the direction switch 94, is displayed on the direction display portion 95. Specifically, the direction display portion 95 includes an LED or the like, and an arrow indicating either forward or rearward is lit.

The speed switch 96 is a switch to set a speed mode of the motor 9 (in other words, speed mode of the cart 1) to either high speed or low speed. The speed mode is switched every time the speed switch 96 is operated (depressed). More than two modes may be available.

The speed mode includes a mode in which an upper limit speed is a specified high speed, and a mode in which an upper limit speed is a specified low speed. The upper limit speed is a speed corresponding to the maximum operation amount of the drive lever 91. The rotation speed of the motor 9 is set by multiplying the upper limit speed in accordance with the speed mode by a ratio corresponding to the operation amount of the drive lever 91. Alternatively, the relationship between the rotation speed and the operation amount may be non-linear, for example to give accurate control at low speeds.

The speed display portion 97 displays the speed mode (high speed or low speed) set through the speed switch 96. The speed display portion 97 include an LED or the like, and is configured to display the set speed mode in two steps.

In the present embodiment, the main power switch 92, the direction switch 94, the direction display portion 95, the speed switch 96, and the speed display portion 97 are assembled to a single board in order to facilitate manufacturing of the operation device 90.

As shown in FIGS. 7 and 9, the battery box 60 includes a box body 61 having an open upper surface, and a lid 62 for opening and closing the upper surface of the box body 61.

In FIG. 9, the battery box 60 accommodates the battery packs 70A, 70B.

The lid 62 is attached to the box body 61 so as to be opened and closed via a hinge. A locking mechanism 63 is provided at an open end of the lid 62 opposite to the hinge. The locking mechanism 63 fixes the closed lid 62 to the box body 61.

The locking mechanism 63 is rotated either to a locked position or to an unlocked position to lock or unlock the lid 62 with respect to the box body 61.

A part of the upper surface of the box body 61 is covered so as not to obstruct the opening and closing of the lid 62. A battery changeover switch 71 and remaining energy display portions 72A, 72B are provided in the covered part.

The battery changeover switch 71 is disposed between positions where the battery packs 70A, 70B are accommodated. The battery changeover switch 71 is operated to select one of the battery packs 70A, 70B as a power source for supplying electric power to the battery box 60 and a later-described circuit board 80. Electric power is supplied to the battery box 60 and the circuit board 80 from either of the battery packs 70A, 70B, depending on an operating position of the battery changeover switch 71. The user of the cart 1 can check the battery pack to be used as a power source by the operating position of the battery changeover switch 71. Alternatively, both battery packs 70A, 70B may be simultaneously selected (in parallel or in series). For example, when both battery packs 70A, 70B have low voltage, they may be selected in series to drive the motor 9 a bit more. An emergency power switch (not shown) may perform this series selection.

Amounts of electric power accumulated in the battery packs 70A, 70B (hereinafter, referred to as "remaining energy") are displayed on the respective remaining energy display portions 72A, 72B. Each of the remaining energy display portions 72A, 72B, in the present embodiment, includes three LEDs arranged in a row. Each of the remaining energy display portions 72A, 72B is configured to display remaining energy by lighting the number of the LEDs corresponding to the remaining energy.

The remaining energy display portions 72A, 72B are assembled on different boards. The remaining energy display portions 72A, 72B are disposed in the vicinity of the positions in which the corresponding battery packs 70A, 70B are accommodated, on opposite sides of the battery changeover switch 71. This provides an intuitive association for the user between, for example, the battery pack 70A and the remaining energy display 72A.

A remaining energy display switch 73 and a light switch 74 are provided on the board to which the remaining energy display portion 72B is assembled. The remaining energy display switch 73 is operated to display the remaining energy of each of the battery packs 70A, 70B on the corresponding remaining energy display portion 72A or 72B. The light switch 74 is operated by the user of the cart 1 to turn on or off the lighting devices 40L, 40R. The light switch 74 corresponds to an example of a lighting operation portion of the present disclosure.

When the user inputs an instruction to display the remaining energy via the remaining energy display switch 73, the remaining energies of both of the battery packs 70A, 70B are displayed for a certain limited time on the remaining energy display portions 72A, 72B by a control circuit 81 described later, regardless of which battery pack is currently selected by the battery changeover switch 71.

However, if only the battery pack 70A is accommodated in the battery box 60, then only the remaining energy of the battery pack 70A is displayed on the remaining energy display portion 72A (and the remaining energy display portion 72B is off or flashing). If only the battery pack 70B is accommodated in the battery box 60, then the remaining energy of the battery pack 70B is displayed on the remaining energy display portion 72B (and the remaining energy display portion 72A is off or flashing).

In the present embodiment, when only one battery pack is accommodated in the battery box 60, the battery changeover switch 71 is switched to a side in which the battery pack is accommodated, so that the accommodated battery pack is used for driving the motor 9.

In FIG. 10, the circuit board 80 is provided inside of the covered part of the battery box 60 provided with the battery changeover switch 71 and the remaining energy display portions 72A, 72B. The circuit board 80 drives the motor 9 and the lighting devices 40L, 40R.

As shown in FIG. 10, the circuit board 80 includes the control circuit 81, an inverter portion 82, a gate circuit 83, a regeneration suppressor 84, a drive circuit 85, a current detector 86, an element temperature detector 87, a power controller 88, and a regulator 89.

The inverter portion 82 receives electric power from the battery pack 70A or the battery pack 70B accommodated in the battery box 60, and supplies a drive current to the motor 9. In the present embodiment, the motor 9 is a three-phase brushless motor. For this reason, the inverter portion 82 includes a three-phase full-bridge circuit provided with six switching elements Q1 to Q6.

The three switching elements Q1 to Q3 in the inverter portion 82 are so-called high-side switches. The switching elements Q1 to Q3 are provided between three terminals at the motor 9 and a positive electrode current path. The positive electrode current path leads to the inverter portion 82 from the battery changeover switch 71. The positive electrode current path is coupled to a positive electrode of the battery pack 70A or the battery pack 70B through the battery changeover switch 71.

The three switching elements Q4 to Q6 in the inverter portion 82 are so-called low-side switches. The switching elements Q4 to Q6 are provided between the three terminals of the motor 9 and a negative electrode current path coupled to a negative electrode of the battery pack 70A or the battery pack 70B. The negative electrode current path leads to the negative electrode of the battery pack 70A or battery pack 70B from the inverter portion 82.

Figure 11A:
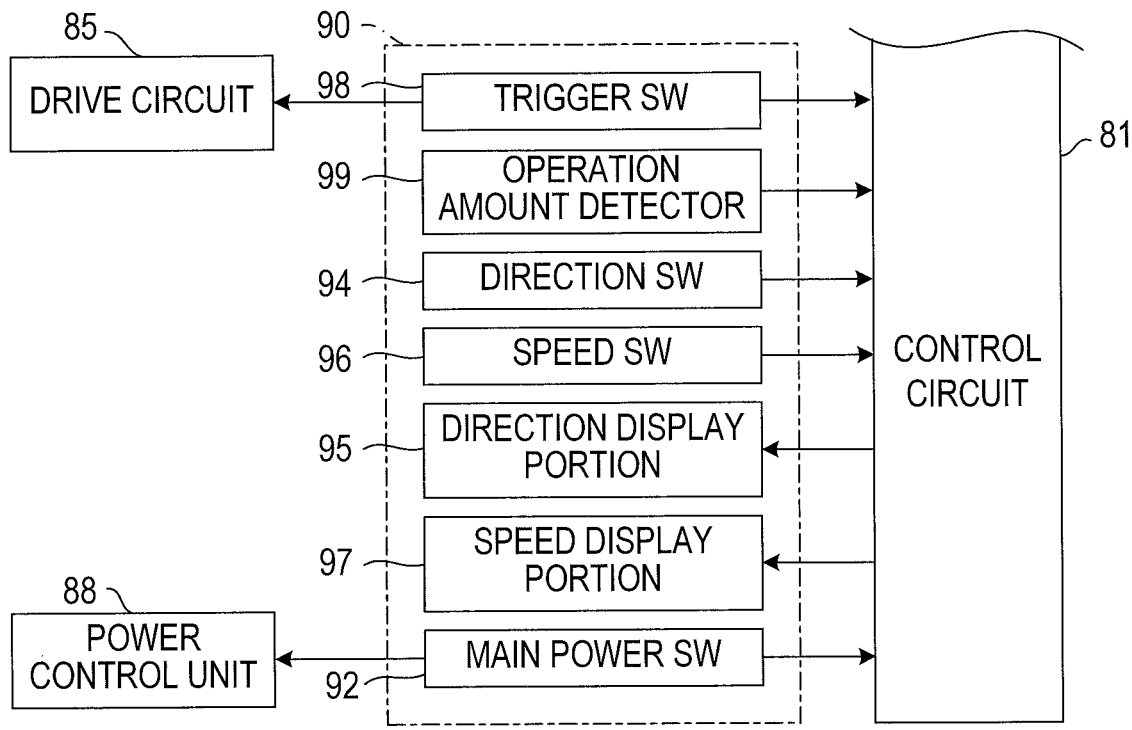
FIG. 11A is a block diagram showing details of the operation device.
Figure 11B:
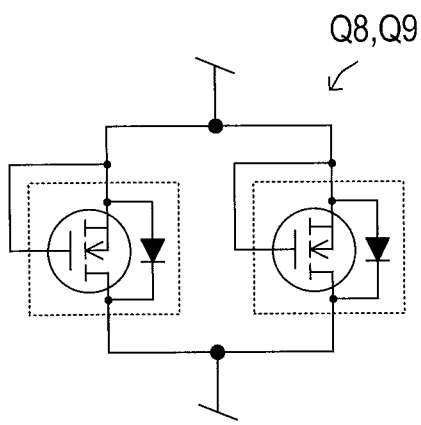
FIG. 11B is a circuit diagram showing details of a reverse flow suppression element in a regeneration suppressor.
Figure 11C:
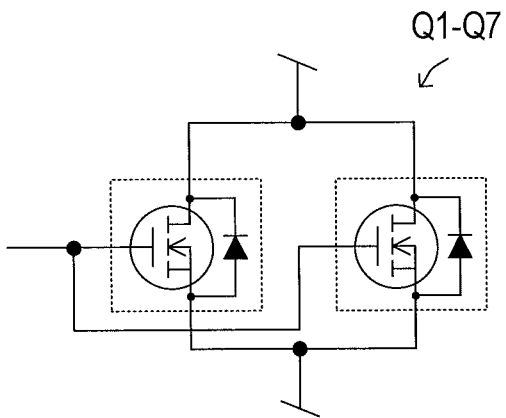
FIG. 11C is a circuit diagram showing details of a switching element in an inverter portion.

As shown in FIG. 11C, each of the switching elements Q1 to Q6 more specifically includes two parallel-coupled n-channel metal oxide semiconductor field effect transistors (MOSFETs). Therefore, in each of the switching elements Q1 to Q6, the drive current supplied to the motor 9 is divided to flow to the two MOSFETs. This flow of the drive current can suppress heat generated in each of the switching elements Q1 to Q6.

The positive electrode current path is provided with a key insertion portion 64 and a trigger switch 98.

As shown in FIG. 9, the key insertion portion 64 is provided inside the box body 61 of the battery box 60. A key 65 is inserted to the key insertion portion 64. The key insertion portion 64 to which the key 65 is inserted conducts the positive electrode current path through a conductive portion of the key 65. The trigger switch 98 is turned on when the drive lever 91 provided in the operation device 90 is operated by the user to conduct the positive electrode current path.

Therefore, when the key 65 is inserted into the key insertion portion 64, and the drive lever 91 is operated, it becomes possible to supply electric power to the inverter portion 82 (and the motor 9) via the positive electrode current path from the battery pack 70A or the battery pack 70B, so that the motor 9 can be driven.

The gate circuit 83 turns on or off the switching elements Q1 to Q6 in accordance with control signals output from the control circuit 81, so as to supply electric current to winding of each phase of the motor 9 to rotate the motor 9.

The regeneration suppressor 84 is provided on the positive electrode current path. The regeneration suppressor 84 suppresses regenerative current from flowing to the positive electrode side of the battery pack 70A or 70B from the inverter portion 82.

The regeneration suppressor 84 includes at least one reverse flow suppression element for suppressing reverse current. The at least one reverse flow suppression element typically includes a diode. However, in present embodiment, the at least one reverse flow suppression element includes switching elements Q8, Q9.

Specifically, each of the switching elements Q8, Q9, as shown in FIG. 11B, includes two parallel-coupled n-channel MOSFETs. Regenerative current is suppressed by parasitic diodes provided in these n-channel MOSFETs.

The n-channel MOSFETs in the switching elements Q8, Q9 are coupled to the battery pack 70A or the battery pack 70B in the positive electrode current path in a direction opposite to the switching elements Q1 to Q6 of the inverter portion 82. Specifically, in the n-channel MOSFETs of the switching elements Q8, Q9, anodes of the parasitic diodes are coupled to the positive electrode of the battery pack 70A or the battery pack 70B, and cathodes of the parasitic diodes are coupled to the negative electrode of the battery pack 70A or the battery pack 70B. Accordingly, the drive current supplied to the motor 9 flows in a forward direction in the parasitic diodes.

The drive current supplied to the motor 9 is divided to two MOSFETs coupled in parallel to each other of the switching elements Q8, Q9 in the regeneration suppressor 84. Therefore, heat generation of each of the switching elements Q8, Q9 due to the drive current is suppressed.

In the regeneration suppressor 84 of FIG. 10, the switching elements Q8, Q9 are provided in series with respect to the positive electrode current path. With such configuration, even if one of the switching elements Q8, Q9 is short-circuited, the other switching element suppresses flow of regenerative current.

The switching element Q7 is provided between the regeneration suppressor 84 and the inverter portion 82 in the positive electrode current path. The drive circuit 85 turns on the switching element Q7 when the trigger switch 98 is turned on, so as to conduct the positive electrode current path.

Conversely, the drive circuit 85, when the trigger switch 98 is turned off, turns off the switching element Q7, so as to cut off the positive electrode current path more reliably. The switching element Q7 includes two parallel-coupled MOSFETs, similar to the switching elements Q1 to Q6 in the inverter portion 82, in order to suppress heat generation.

The current detector 86 is provided on the negative electrode current path, and detects a value of the drive current flowing to the motor 9. The current detector 86 includes a current detecting element that generates a detection signal corresponding to the value. The current detecting element may be, for example a shunt resistor (not shown).

The element temperature detector 87 detects temperature of the inverter portion 82 (temperature of the switching elements Q1 to Q6 of the inverter portion 82 in detail). The element temperature detector 87 includes, for example, a temperature detecting element such as a thermistor, and outputs a detection signal corresponding to the detected temperature.

The detection signals from the current detector 86 and the element temperature detector 87 are inputted to the control circuit 81.

The motor 9 includes a rotation position detector 78 that detects a rotation position (angle) of the motor 9, and a motor temperature detector 79 that detects temperature of the motor 9. Detection signals output from these detectors 78 and 79 are also input to the control circuit 81.

Battery power (or, more accurately, battery current) is input to the power controller 88 from the battery packs 70A, 70B via a first set of diodes DA and a second set of diodes DB. The power controller 88 supplies the input battery power to the regulator 89.

The reason why there is no key insertion portion 64 between the power controller 88 and the battery packs 70A, 70B is to be able to supply battery power to the regulator 89 even if the current path from the battery packs 70A, 70B to the motor 9 is cut off due to removal of the key 65 from key insertion portion 64.

The first set of diodes DA include diodes DA1, DA2 coupled in series. An anode of the diode DA1 is coupled to the positive electrode of the battery pack 70A and a cathode of the diode DA2 is coupled to the power controller 88. The second set of diodes DB include diodes DB1, DB2 coupled in series. An anode of the diode DB1 is coupled to the positive electrode of the battery pack 70B, and a cathode of the diode DB2 is coupled to the power controller 88.

The reason why each of the first set of diodes DA and the second set of diodes DB includes two diodes coupled in series is to suppress flowing of a charging current from the battery pack 70B to the battery pack 70A (or vice versa) by one of the diodes even if the other is short-circuited.

The power controller 88, in accordance with a command from the control circuit 81 supplies the battery power to the regulator 89, or cuts off the supply of the battery power to the regulator 89. The power controller 88, when at least one of: (i) the remaining energy display switch 73; (ii) the light switch 74; and (iii) the main power switch 92 is operated (and a corresponding signal is received from the operated switch), supplies the battery power to the regulator 89.

The regulator 89 generates power supply voltage (for example, direct current voltage having a constant voltage value such as 5 volts) Vcc for operating the control circuit 81 and the peripheral circuits from the battery power supplied from the power controller 88 and supplies the power supply voltage Vcc to each of these circuits. The regulator 89 is an example of a power source portion of the present disclosure.

The control circuit 81, during operation of the control circuit 81, can output a command to the power controller 88 to stop supply of the power supply voltage Vcc from the regulator 89, and stop operation of the control circuit 81 itself. Further, the user, when operation of the control circuit 81 is stopped, can operate the main power switch 92, the remaining energy display switch 73, the light switch 74, etc. to start the control circuit 81 and to urge the control circuit 81 to implement various types of control.

The control circuit 81 includes a Micro Control Unit (MCU) including a CPU, a ROM, a RAM, etc. The control circuit 81 controls the drive current supplied to the motor 9 via the gate circuit 83, so as to control the rotation speed and the rotation direction of the motor 9. The control circuit 81 corresponds to an example of a lighting controller and a cart controller of the present disclosure.

The control circuit 81 also causes the lighting devices 40L, 40R to be turned on or off, causes the remaining energies to be displayed on at least one of the remaining energy display portions 72A, 72B, causes the traveling direction of the cart 1 to be displayed on the direction display portion 95, causes the set speed to be displayed on the speed display portion 97, and the like.

Thus, the rotation position detector 78, the motor temperature detector 79, the gate circuit 83, the current detector 86, the element temperature detector 87, the power controller 88, the lighting devices 40L, 40R, the battery box 60, and various display portions, various switches and the like provided in the operation device 90 are also coupled to the control circuit 81.

Specifically, the remaining energy display portions 72A, 72B, the remaining energy display switch 73, and the light switch 74 are coupled to the control circuit 81. Also, a signal (not shown) indicating the selected battery pack is input from the battery changeover switch 71 to the control circuit 81.

As shown in FIG. 11A, the main power switch 92, the direction switch 94, the direction display portion 95, the speed switch 96, the speed display portion 97, and the trigger switch 98 are also coupled to the control circuit 81.

Further, as shown in FIG. 10, the battery box 60 is provided with voltage detectors 66A, 66B and a buzzer 68. The voltage detectors 66A, 66B respectively detect voltages (battery voltages) output from the battery packs 70A, 70B. The buzzer 68 generates a notification sound when the cart 1 is not operating properly, as will be described later. The battery packs 70A, 70B include therein respective batteries, and respective battery communicators 69A, 69B to report battery states.

Referring to FIG. 10, the brake lever 18 is provided with a brake switch 76. The brake switch 76 is turned on when the brake lever 18 is operated (in other words, when the braking device 17 is operated). Further, as shown in FIG. 11A, the operation device 90 is also provided with an operation amount detector 99 that detects an operation amount of the drive lever 91 (i.e., pulling amount of the trigger).

Referring to FIG. 10, the voltage detectors 66A, 66B, the buzzer 68, the battery communicators 69A, 69B, the brake switch 76, and the operation amount detector 99 are also coupled to the control circuit 81.

Figure 12:
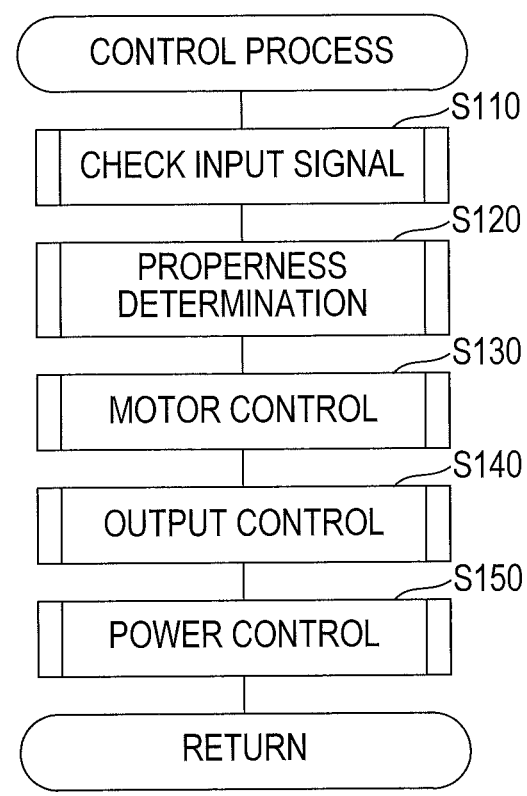
FIG. 12 is a flowchart showing a control process.

The control circuit 81, when receiving the power supply voltage Vcc from the regulator 89 and started, performs a control process shown in FIG. 12.

When the control process is started, the control circuit 81, in S110 (S denotes the step), receives signals input from various switches and various detectors coupled to the control circuit 81, and checks the received input signals.

In S120, based on the input signals received in S110, the control circuit 81 performs properness determination. Specifically, the control circuit 81 determines whether the battery packs 70A, 70B are in proper state, whether various circuits such as the inverter portion 82 assembled to the circuit board 80 are operating properly, whether the motor 9 is in proper state, etc. That is, in S120, it is determined whether specific portions of the cart 1 are operating properly or in proper state.

In S130, in response to the determination that no improper operation and no improper state are detected in S120, driving of the motor 9 is controlled. In this drive control, the control circuit 81 sets the rotation speed of the motor 9 in accordance with the speed mode set via the speed switch 96 and the operation amount of the drive lever 91 detected by the operation amount detector 99. The control circuit 81 also sets the traveling direction (rotation direction) in accordance with the direction switch 94.

In S140, based on the signals from various switches received in S110, output control is performed. Specifically, the control circuit 81 causes the remaining energies to be displayed on the remaining energy display portions 72A, 72B, causes the traveling direction to be displayed on the direction display portion 95, causes the speed mode to be displayed on the speed display portion 97, causes the lighting devices 40L, 40R to be turned on or off, and the like.

Further, in S140, in response to the determination that improper operation or improper state is detected in S120, the control circuit 81 reports that improper operation or improper state has been detected, by using the remaining energy display portions 72A, 72B and/or the buzzer 68.

Figure 13:
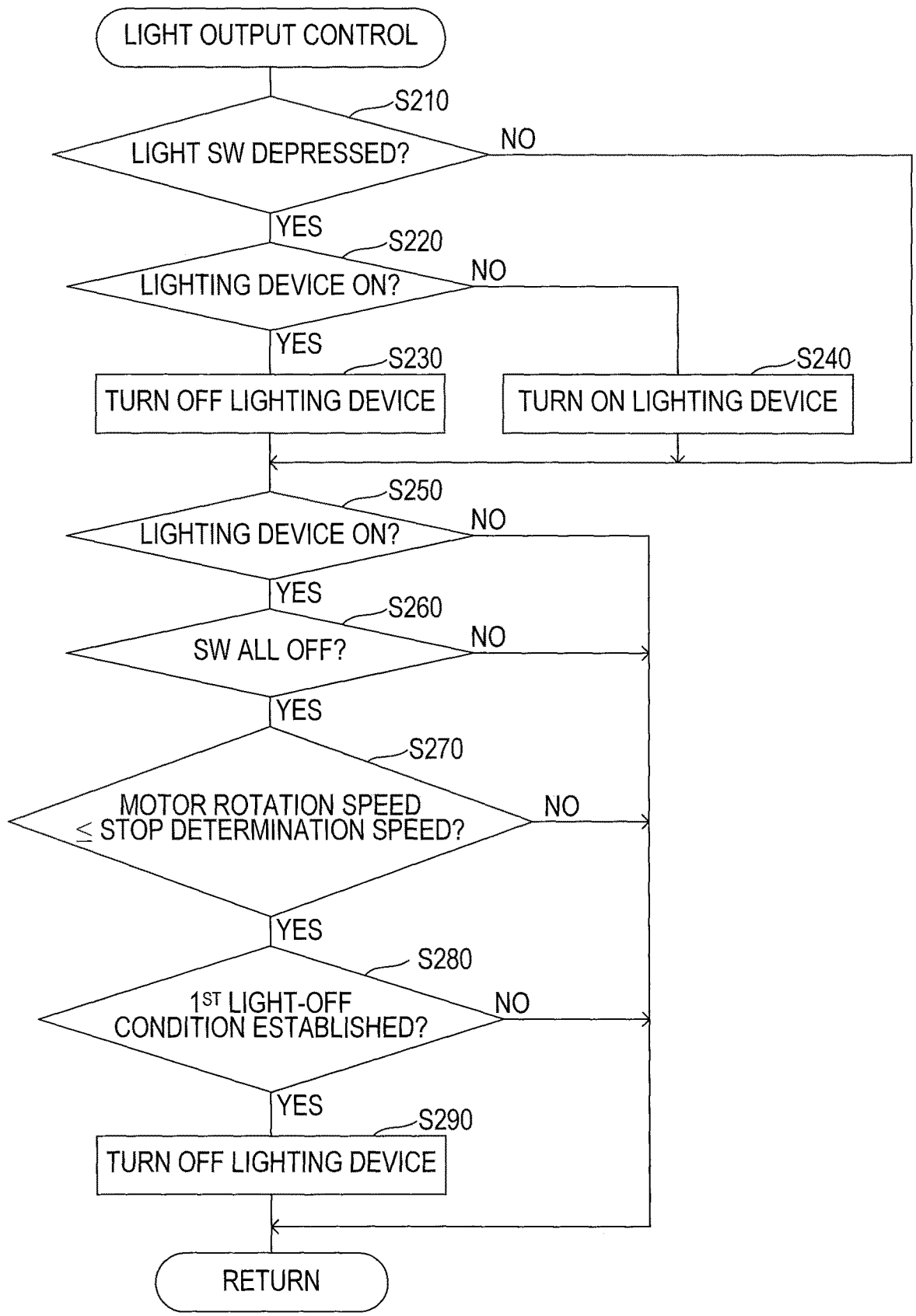
FIG. 13 is a flowchart showing light output control performed in S140 of FIG. 12.

Light output control for turning on or off the lighting devices 40L, 40R included in the output control performed in S140 will be performed in a procedure shown in FIG. 13.

That is, in the light output control, the control circuit 81 determines in S210 whether the light switch 74 is depressed. If the light switch 74 is depressed, then the process proceeds to S220. If the light switch 74 is not depressed, then the process proceeds to S250.

In S220, it is determined whether the lighting devices 40L, 40R are currently turned on. If the lighting devices 40L, 40R are turned on, then the lighting devices 40L, 40R are turned off in S230, and the process proceeds to S250. If the lighting devices 40L, 40R are not turned on, then the lighting devices 40L, 40R are turned on in S240, and the process proceeds to S250.

In S250, it is determined whether the lighting devices 40L, 40R are currently turned on. If the lighting devices 40L, 40R are not turned on, then the light output control is terminated. If the lighting devices 40L, 40R are turned on, then the process proceeds to S260.

In S260, it is determined whether various switches coupled to the control circuit 81 are not operated by the user and are all off. If one of the switches is operated by the user and turned on, then the light output control is terminated. If all of the various switches are not operated by the user and are all off, then the process proceeds to S270. For example, if the trigger switch 98 is on, then light output control is terminated.

In S270, it is determined whether the rotation speed of the motor 9 (calculated based on the detection signal from the rotation position detector 78) is equal to or less than a preset stop determination speed of the cart 1 (e.g., 100 rpm).

If the rotation speed of the motor 9 is equal to or less than the stop determination speed, it is determined that the cart 1 is not pushed by the user and is in stopped state. The process proceeds to S280. If the rotation speed of the motor 9 exceeds the stop determination speed, then it is determined that the cart 1 is moving (probably due to being pushed by the user) and the light output control is terminated in this case (leaving the lighting device on, as previously determined in S250).

In S280, it is determined whether a first light-off condition is established. The first light-off condition may be established, for example when a first certain condition continues for a specified set time (e.g., 10 minutes) or more. The first certain condition may include a condition in which (i) various switches are determined all turned off in S260 (in other words, not operated by the user) and (ii) the rotation speed of the motor 9 is determined equal to or less than the stop determination speed in S270.

If it is determined in S280 that the first light-off condition is established, then the lighting devices 40L, 40R are turned off in S290, and then the light output control is terminated (leaving the lighting devices 40L, 40R turned off). If it is determined in S280 that the first light-off condition is not established, then the light output control is terminated in this case (leaving the lighting device on, as previously determined in S250).

To summarize, if a) the motor is stopped and b) all switches are off and c) a firth light-off condition (such as an elapsed time) is established, then the lighting devices 40L, 40R are "automatically" turned off. Thus, it is possible to reduce power consumption required to light the lighting devices 40L, 40R, even when the key 65 is left in the key insertion portion 64 and turned on.

Conditions that the lighting devices 40L, 40R are automatically turned off include not only a condition that various switches (corresponding to an example of a cart operation portion in the present disclosure) provided in the battery box 60 and the operation device 90 are not operated, but also a condition that the cart 1 is in stopped state for the set time or more.

Therefore, the lighting devices 40L, 40R are suppressed from being automatically turned off when the user is pushing the cart 1 while holding the grips 15L, 15R of the handle portions 16L, 16R without operating various switches. Usability of the cart 1 by the user is improved.

In FIG. 12, when the output control in S140 is completed, the control circuit 81 performs power control in S150.

In the power control in S150, if driving of the motor 9 and the lighting devices 40L, 40R is stopped and signal inputs from various switches are not confirmed for a specified time or more in S110, then a command is output to the power controller 88, and supply of the power supply voltage Vcc from the regulator 89 is stopped.

Figure 14:
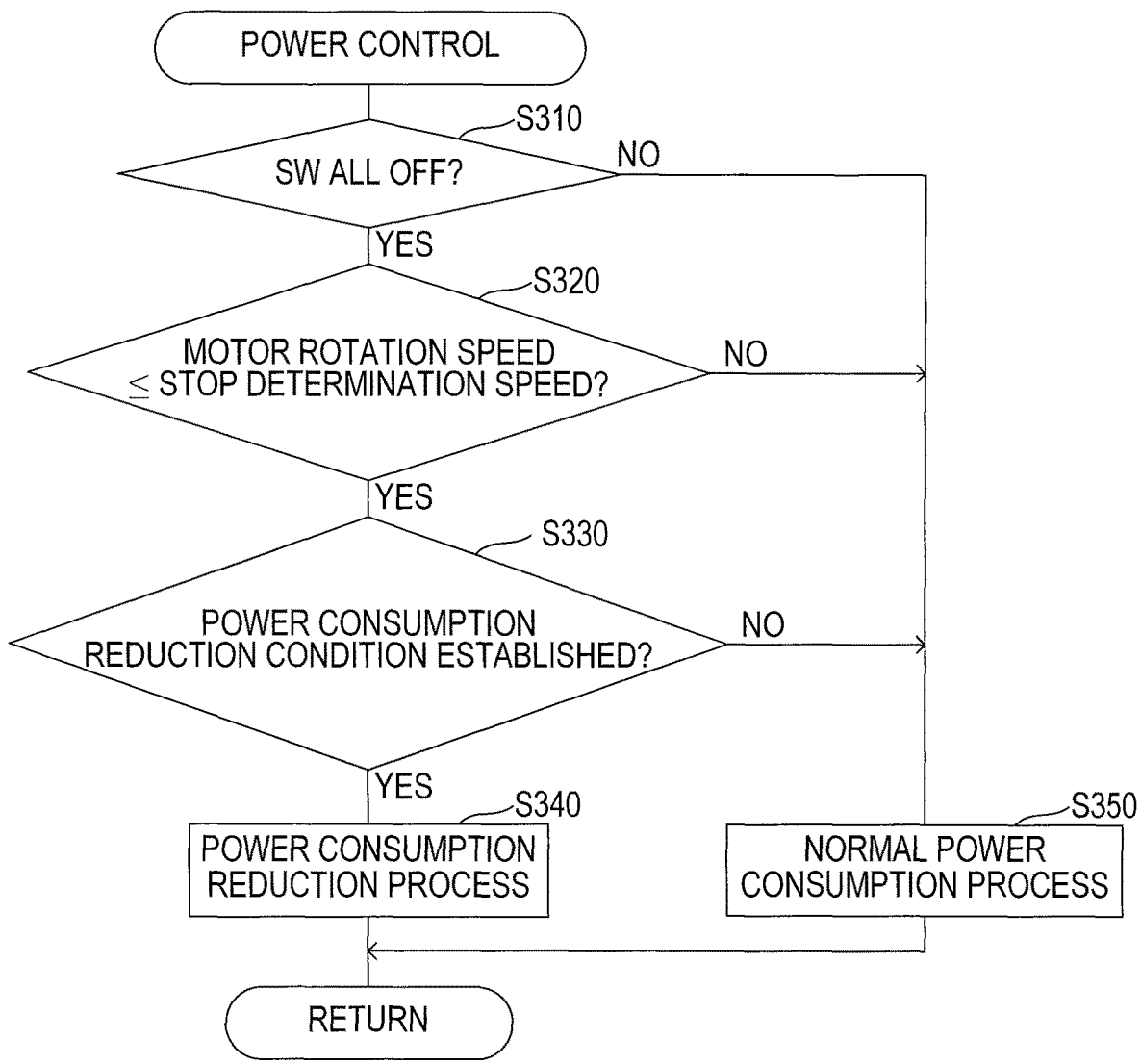
FIG. 14 is a flowchart illustrating a power control performed in S150 in FIG. 12.

That is, in the power control, the control circuit 81, as shown in FIG. 14, determines in S310 whether various switches coupled to the control circuit 81 are not operated by the user and are all turned off.

If one of the switches is operated by the user and is turned on, then the process proceeds to S350. In S350, a normal power consumption process is performed. Specifically, in the present embodiment, if the power controller 88 is presently off, then the power controller 88 is turned on (the battery voltage is supplied to the regulator 89, and the power supply voltage Vcc is supplied from the regulator 89 to the control circuit 81). If the power controller 88 is already turned on when the process moves to S350, then the power controller 88 is maintained to be on. After the process of S350, the power control is terminated.

When it is determined in S310 that various switches coupled to the control circuit 81 are all turned off, the process proceeds to S320. In S320, it is determined whether the rotation speed of the motor 9 is equal to or less than the stop determination speed. The process of S320 is performed in the same manner as in S270.

If the rotation speed of the motor 9 is equal to or less than the stop determination speed, then it is determined that the cart 1 is not pushed by the user and is in stopped state. The process proceeds to S330. However, if the rotation speed of the motor 9 is not equal to or less than the stop determination speed, then it is determined that the cart 1 is pushed by the user and is moving, and the process proceeds to S350.

In S330, it is determined whether a power consumption reduction condition is established. The power consumption reduction condition may be established, for example when a second certain condition continues for a specified set time (e.g., 10 minutes) or more. The second certain condition may include a condition in which (i) various switches are determined all turned off in S310 and (ii) the rotation speed of the motor 9 is determined equal to or less than the stop determination speed in S320.

In S330, if it is determined that the power consumption reduction condition is established, then the process proceeds to S340. In S340, a power consumption reduction process is performed. Specifically, in the present embodiment, the power controller 88 is turned off, so as to cut off supply of the battery power to the regulator 89. As a result, supply of the power supply voltage Vcc from the regulator 89 to the control circuit 81 is stopped, and operation of the control circuit 81 stops.

Therefore, if the state in which cart 1 is not utilized by the user continues for the set time or more, then it is possible to suppress supply of the power supply voltage Vcc to the control circuit 81 and the peripheral circuits from the regulator 89, so that the battery power is not consumed by these portions.

After the process of S350, the process returns to S110. When the power consumption reduction process is performed in S340, operation of the control circuit 81 stops in the present embodiment. However, if any of the switches is operated after the power consumption reduction process is performed and the operation of the control circuit 81 stops, then the power controller 88 is turned on, and the power supply voltage Vcc is supplied from the regulator 89 to the control circuit 81. Therefore, the control circuit 81 is started by the power supply voltage Vcc and starts the control process.

Turning off of the power controller 88 by the control circuit 81 to stop the operation of the regulator 89 occurs when the state in which various switches are not operated by the user and in which the cart 1 is stopped continues for the set time or more. Therefore, it is possible to suppress stopping of the operation of the control circuit 81 while the user is pushing the cart 1 to travel. The user, without stopping the control circuit 81, can push and move the cart 1.

As above, the cart 1 of the present embodiment is provided with the lighting devices 40L, 40R that emit light to the front of the front wheel 3. Therefore, the user can turn on the lighting devices 40L, 40R and emit light to the front of the cart 1 when performing carrying work outdoors at night, or when performing carrying work in a dark place such as a warehouse. Therefore, there is no need for the user to perform carrying work with a flashlight, or install a lighting device in the work site. Working efficiency of carrying work can be improved.

The lighting devices 40L, 40R are not provided at a leading end of the body frame 10, but are provided on the left and right thereof. Further, the lighting devices 40L, 40R are covered with the protective cover 49. Thus, the lighting devices 40L, 40R are protected from damage due to hitting an obstacle or the like.

The lighting devices 40L, 40R are turned off automatically by the light output control described above, when the cart 1 is not used. Therefore, power consumption of the lighting devices 40L, 40R is reduced.

Further, the control circuit 81 cuts off the supply of the battery power to the regulator 89 and stops operation of the control circuit 81 itself by the power control described above, when the cart 1 is not used. Therefore, power consumption of the control circuit 81, and power consumption consumed by other than the control circuit 81 in accordance with the operation of the control circuit 81 can be reduced.

Embodiment of the present disclosure has been described in the above. However, the push cart of the present disclosure is not limited to the above embodiment and can be modified in various ways.

For example, in the above embodiment, it is explained that the lighting devices 40L, 40R are simply turned on or off in the light output control. In contrast, before the first light-off condition is established in S280, that is, before the lighting devices 40L, 40R are turned off in the light output control, brightness (illuminance) of the lighting devices 40L, 40R may be temporarily reduced.

A variation of the light output control will be described with reference to a flowchart of FIG. 15. The light output control shown in FIG. 15 is configured to temporarily reduce brightness of the lighting devices 40L, 40R in response to establishment of a light-off notification condition, before the lighting devices 40L, 40R are turned off in response to establishment of a second light-off condition.

Figure 15:
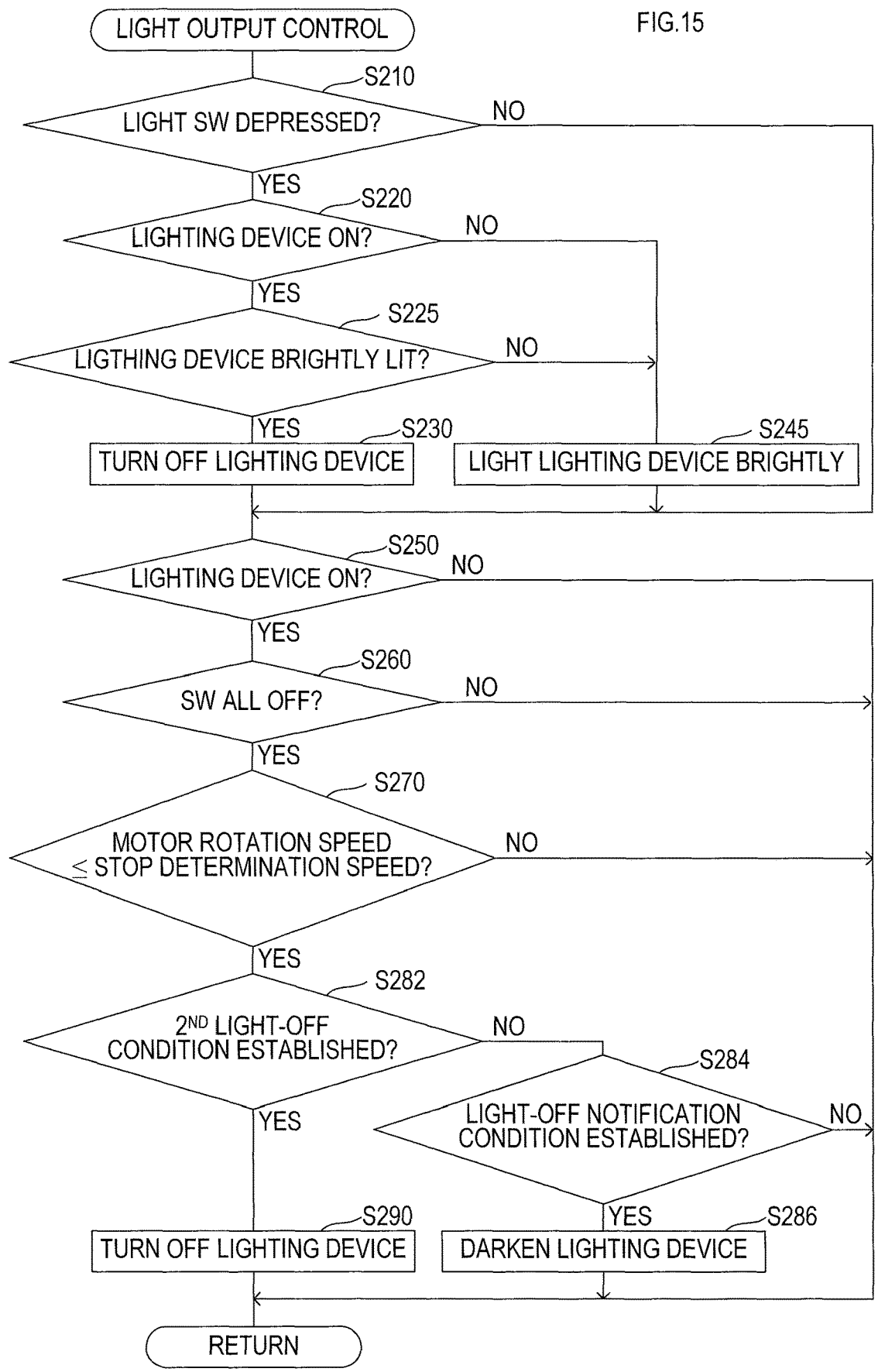
FIG. 15 is a flowchart showing a modification of the light output control of FIG. 13.

The basic procedure of the light output control shown in FIG. 15 is very similar to the light output control shown in FIG. 13. For this reason, the following description will merely describe differences from the light output control shown in FIG. 13, and will not describe the same parts as those of the light output control shown in FIG. 13. In FIG. 15, the lighting devices 40L, 40R may be brightly lit (high illumination), grey lit (low illumination, but non-zero), or turned off (no illumination).

In the light output control shown in FIG. 15, when it is determined in S220 that the lighting devices 40L, 40R are turned on (brightly lit, or grey lit), the process proceeds to S225. In S225, it is determined whether a specified electric current is supplied to the LEDs and the lighting devices 40L, 40R are brightly lit (in other words, whether illuminance is high). Alternatively, electric power supplied to the LEDs may be used to make these determinations.

If it is determined in S225 that the lighting devices 40L, 40R are brightly lit (high illumination), then the process proceeds to S230, and the lighting devices 40L, 40R are turned off. However, it it is determined in S225 that the lighting devices 40L, 40R are grey lit (in other words, illuminance is low) or it is determined in S220 that the lighting devices 40L, 40R are off (illumination is zero), then the process proceeds to S245.

In S245, electric current having a specific value is supplied to the LEDs of the lighting devices 40L, 40R to light the lighting devices 40L, 40R brightly (high illumination). The process proceeds to S250.

If it is positively determined in S250, S260, and S270 sequentially, then the process proceeds to S282. In S282, it is determined whether the second light-off condition is established. The second turn-off condition may be established, for example, when a state positively determined in S250, S260, and S270 continues for a first set time or more.

In S282, if the second light-off condition is not established, then the process proceeds to S284. In S284, it is determined whether the light-off notification condition is established. The light-off notification condition may be established, for example, when a state positively determined in S250, S260, and S270 continues for a second set time or more. The second set time may be shorter than the first set time by a specified wait time.

When it is determined in S284 that the light-off notification condition is established, the process proceeds to S286. In S286, the electric current supplied to the LEDs of the lighting devices 40L, 40R is reduced so as to reduce illuminance of the lighting devices 40L, 40R to a low level (that is not zero). In other words, the lighting devices 40L, 40R are grey lit.

If it is determined that illuminance at the time of lighting of the lighting devices 40L, 40R is reduced in S286 (to grey lit), or the light-off notification condition is not established in S284, then the light output control is terminated.

If it is determined in S282 that the second light-off condition is established, then the process proceeds to S290. In S290, supply of the electric current to the LEDs of the lighting devices 40L, 40R is cut off to turn off the lighting devices 40L, 40R. Then the light output control is terminated.

Thus, in the light output control shown in FIG. 15, if the lighting devices 40L, 40R are turned on in response to operation of the light switch 74, then the lighting devices 40L, 40R are brightly lit with high illuminance in S245.

Then, during the lighting, if the light-off notification condition is established in S284 (without establishing a second light-off condition at step S282), then illuminance of the lighting devices 40L, 40R is reduced. After illuminance is reduced, if a specified wait time further elapses (i.e., the second light-off condition is established in S282), then the lighting devices 40L, 40R are turned off.

Therefore, the user can detect that the lighting devices 40L, 40R are turned off in the specified wait time, when the lighting devices 40L, 40R, which are emitting bright light, are grey lit.

Therefore, if the user desires the lighting devices 40L, 40R to be brightly lit with normal illuminance, or the lighting devices 40L, 40R not to be turned off, then the user can, for example, operate the light switch 74 to continue the brightly lit state of the lighting devices 40L, 40R.

In S286, instead of reducing illuminance of the lighting devices 40L, 40R to grey the lighting devices 40L, 40R, the lighting devices 40L, 40R may blink, for example.

In the above embodiments, if positive determinations are made in S310 to S330 in the power supply control, then supply of battery power from the power controller 88 to the regulator 89 is stopped in the power consumption reduction process of S340, and power supply to the control circuit 81 is cut off.

However, such power control can be performed only in a case in which there is the power controller 88 configured to start supplying battery power to the regulator 89 when at least one of various switches is operated by the user. If there is no such power controller 88, the power control described above may not be performed.

Therefore, in the power supply control shown in FIG. 14, the control circuit 81 may be switched from a normal operation mode to a low power consumption mode (so-called sleep mode) so as to stop normal operation in the power consumption reduction process of S340. Thus, the amount of power consumed by the control circuit 81 is reduced, and the same effect as in the above embodiments can be achieved.

Further, in case that the operation mode is switched to the low power consumption mode in the power consumption reduction process in S340, the operation mode may be returned from the low power consumption mode to the normal operation mode in the normal power consumption process of S350. In this case, the user can make the control circuit 81, which has been switched to the low power consumption mode, return to the normal operation by the switch operation.

In the above embodiments, the cart 1 is described as a tricycle with two driven wheels (i.e. rear wheels 5L, 5R). The cart 1 may be a unicycle with a single driving wheel rotationally driven by a motor. For example, in the cart 1 in the above embodiments, the rear wheel support portions 7L, 7R may be provided with foot portions for grounding, in place of the rear wheels 5L, 5R. Further, the cart 1 may have four or more wheels, or may have only two "front" wheels and some rear foot portions for grounding.

Further, in the above embodiments, it is described that the LEDs of the lighting devices 40L, 40R receive power supply from the control circuit 81 to be turned on or off. A power source to turn on the lighting devices 40L, 40R may be, for example, a cell battery or a generator that generates electricity by rotation of a wheel.

The lighting devices 40L, 40R may include a light source different from LED (e.g., a filament bulb). The number of lighting devices 40L, 40R and their locations may be changed as appropriate depending on usage of the push cart.

In the above embodiments, the lighting devices 40L, 40R are turned on by operation of the light switch 74. The lighting devices 40L, 40R may be turned on by operation of other switches different from the light switch 74. That is, other switches such as the trigger switch 98 may be also used as a switch for simultaneously turning on the lighting devices 40L, 40R. The lighting devices 40L, 40R may be turned on automatically when the cart 1 is hand pushed and starts to move.

Further, the push cart of the present disclosure is not limited to an electric cart in which a front wheel is driven by the motor 9. The push cart may not be equipped with a driving source such as the motor 9.

Also, a plurality of functions achieved by a single component in the above embodiments may be achieved by a plurality of components, or a single function achieved by a single component may be achieved by a plurality of components. Further, a plurality of functions achieved by a plurality of components may be achieved by a single component, or a single function achieved by a plurality of components may be achieved by a single component. It is also possible to omit a part of the configuration of the above embodiments. Further, the component of any of the above embodiments may be added to the other of the embodiments or may be substituted with a component of the other of the embodiments.

What is claimed is:

1. A push cart comprising:
   a wheel;
   a body frame including a handle portion and configured to rotatably support the wheel, the body frame being further configured to be able to mount a loading platform on the body frame, the handle portion being configured to be gripped by a user of the push cart;
   a lighting device configured to emit light;
   a lighting operation portion configured to be operated by the user; and
   a lighting controller configured to turn on or off the lighting device in response to operation of the lighting operation portion,
   wherein the lighting controller is further configured to turn off the lighting device in response to establishment of a first light-off condition, and
   wherein the first light-off condition is established in response to a continuous stop of the push cart for a certain period of time in a state in which the lighting device is on.

2. A push cart comprising:
   a wheel;
   a body frame including a handle portion and configured to rotatably support the wheel, the body frame being further configured to be able to mount a loading platform on the body frame, the handle portion being configured to be gripped by a user of the push cart;
   a lighting device configured to emit light;
   a lighting operation portion configured to be operated by the user; and
   a lighting controller configured to turn on or off the lighting device in response to operation of the lighting operation portion,
   wherein the lighting controller is further configured to notify the user of turning-off of the lighting device in response to establishment of a light-off notification condition, and
   wherein the light-off notifying condition is established in response to a continuous stop of the push cart for a certain period of time in a state in which the lighting device is on.

3. The push cart according to claim 2,
   wherein the lighting controller is configured to notify the user of turning-off of the lighting device by blinking the lighting device.

4. The push cart according to claim 2,
   wherein the lighting controller is configured to notify the user of turning-off of the lighting device by reducing illuminance of the light.

5. The push cart according to claim 2,
   wherein the lighting controller is further configured to turn off the lighting device in response to establishment of a second light-off condition, and wherein the second light-off condition is established in response to a continuous stop of the push cart for a specified wait time after the light-off notification condition is established.

6. A push cart comprising:

a wheel;

a body frame including a handle portion and configured to rotatably support the wheel, the body frame being further configured to be able to mount a loading platform on the body frame, the handle portion being configured to be gripped by a user of the push cart;

a lighting device configured to emit light; a cart operation portion configured to be operated by the user;

a cart controller configured to control the push cart in response to operation of the cart operation portion; and a power source portion configured to supply electric power to the cart controller, wherein the cart controller is configured to reduce power consumption in the cart controller in response to establishment of a power consumption reduction condition, and wherein the power consumption reduction condition is established in response to a continuous stop of the push cart for a certain period of time.

7. The push cart according to claim 6, wherein the cart controller is configured to reduce the power consumption by cutting off electric power supplied from the power source portion to the cart controller.

8. The push cart according to claim 6, wherein the cart controller is configured to reduce the power consumption by switching an operation mode of the cart controller to a low power consumption mode.

* * * * *